US006941180B1

(12) United States Patent
Fischer et al.

(10) Patent No.: US 6,941,180 B1
(45) Date of Patent: Sep. 6, 2005

(54) AUDIO CASSETTE EMULATOR

(76) Inventors: Addison M. Fischer, 3506 Marcantile Ave., Naples, FL (US) 33942; Robert L. Protheroa, 3506 Marcantile Ave., Naples, FL (US) 33942

( * ) Notice: Subject to any disclaimer, the term of this patent is extended or adjusted under 35 U.S.C. 154(b) by 0 days.

(21) Appl. No.: 09/363,411

(22) Filed: Jul. 29, 1999

Related U.S. Application Data

(60) Provisional application No. 60/112,698, filed on Aug. 27, 1998, provisional application No. 60/138,551, filed on Jun. 10, 1999.

(51) Int. Cl.[7] .......................... G06F 17/00; H04B 1/20
(52) U.S. Cl. .............................. 700/94; 369/2; 369/11
(58) Field of Search ........................... 700/94; 369/2, 369/10, 11, 12; 381/124; 360/90, 96.1, 96.2, 360/96.3, 137; 73/862.44, 862.51

(56) References Cited

U.S. PATENT DOCUMENTS

| 4,553,182 A | * | 11/1985 | Narita ........................ 360/96.1 |
| 4,955,934 A | | 9/1990 | Stehr ...................... 73/862.326 |
| 5,606,467 A | * | 2/1997 | Hirata .......................... 360/69 |
| 5,734,781 A | * | 3/1998 | Cantone ....................... 386/46 |
| 5,815,335 A | * | 9/1998 | Nishimura et al. ........... 360/69 |
| 6,052,264 A | * | 4/2000 | Curtis .......................... 360/137 |
| 6,243,686 B1 | * | 6/2001 | McPherson et al. ......... 704/500 |
| 6,327,633 B1 | * | 12/2001 | Chawla et al. ................. 710/62 |

* cited by examiner

Primary Examiner—Xu Mei
(74) Attorney, Agent, or Firm—Nixon & Vanderhye P.C.

(57) ABSTRACT

A device of the same general physical size and shape as a standard audio cassette tape, but which accepts digital information from any of a variety of sources—including for example: Internet transmission, a digital computer, or memory cards (especially digital memory cards)—and plays this digital information through any, for example, standard audio tape cassette player. The device operates by converting the digital representation of the sound into magnetic signals which are presented to the read/write head of the cassette player equipment. The device allows the user of the cassette player to regulate the audio playback using conventional equipment controls such as: START, STOP, REWIND, FAST REWIND, FORWARD, FAST FORWARD, etc. In one exemplary implementation, the device has the same general physical dimensions of a standard audio cassette; at least one digital processor; and a slot into which electronic media such as, for example, memory cards, smart cards having a processor and a memory embodied thereon and other memory media may be inserted. Converter circuitry converts data stored in digital memory to an analog signal which is magnetically coupled to the read head of the equipment. Numerous sensors detect changes in at least one of the tape equipment mechanisms in the audio cassette emulator.

43 Claims, 11 Drawing Sheets

AUDIO CASSETTE EMULATOR

This application is related to and claims the benefit under 37 CFR § 119(e)(1) of provisional application Ser. No. 60/112,698, filed on Aug. 27, 1998 and the benefit of provisional application No. 60/138,551, filed Jun. 10, 1999, each of which is incorporated herein by reference.

FIELD OF THE INVENTION

The present invention relates to a device which accepts digital information, allows the digital information to be rendered on standard "equipment" (e.g., an analog cassette player), and allows the user of the equipment to control the rendering using the equipment's standard controls. For example, the present invention may be utilized in connection with the playback of a musical or other performance recorded in digital form on standard playback equipment.

BACKGROUND AND SUMMARY OF THE INVENTION

Heretofore (see, e.g., U.S. Pat. No. 5,159,182, No. 5,338,923, No. 5,457,590, No. 5,471,038 and No. 5,584,043) others have described devices which allow digitized audio or graphics information to be interfaced to equipment that operates with magnetic storage media (e.g., floppy disks and cassettes) by converting the digital information to magnetic signals which are read or "played" by the equipment's magnetic read heads.

The present invention extends this technology in many ways such as by allowing the user of the equipment to operate the equipment's standard controls to regulate the device. Various specific exemplary embodiments of the invention include, without limitation, a device of the same general physical size and shape as a standard audio cassette tape, but which accepts digital information from any of a variety of sources—including for example: Internet transmission, a digital computer, or memory cards (especially digital memory cards)—and plays this digital information through any standard audio tape cassette player. The device operates by converting the digital representation of the sound into magnetic signals which are presented to the read/write head of the cassette player equipment. The device allows the user of the cassette player to regulate the audio playback using conventional equipment controls such as: START, STOP, REWIND, FAST REWIND, FORWARD, FAST FORWARD, etc. In an additional embodiment, the device also includes user input control buttons, a display and a headphone jack all mounted in the case of the cassette device such that they are substantially flush with the case and will not interfere with the use in a cassette player. In this embodiment the user can use the cassette device in a cassette player and also use the cassette device as a portable and free standing, digital audio player.

The exemplary embodiments described herein provide advantages over other technology which interfaces digital information through conventional magnetic read/write devices. For example, the illustrative embodiments contrast with existing CD-to-cassette adapters in a number of ways such as by: (1) being self-contained and not requiring a connection to another device outside the bounds of the playing equipment—there are no wires protruding from the equipment; (2) containing a digital processor—it is not merely a simplistic connector or "plug"; and (3) controlling the rendering (playback) through use of the equipment's normal controls—rather than the control of, say, an external CD player. The exemplary embodiments differ from other processor-based digital adapters, for example, by allowing the rendition to be controlled by the equipment's playback controls.

The invention relates to a device which accepts digital information from any of a number of different sources, converts such digital information to magnetic signals which are read by the playing equipment. These two components are often generically referred to hereinafter as the "device" and the "equipment". The device provides for response to controls operated by the user of the playing equipment. In an additional embodiment, the user can also remove the device from the equipment and operate user controls integral to the device in a free standing manner.

In one exemplary implementation, the device has the same general physical dimensions of a standard audio cassette; at least one digital processor; and a slot into which electronic media such as, for example, memory cards, smart cards having a processor and a memory embodied thereon or media sized to be received by the device and being of the type commercially sold by Toshiba Corporation as SmartMedia, or commercially sold by SanDisk Corporation or Sony Corporation as a MultiMedia card, or Memory Stick, respectively. The device includes converter circuitry whereby digital data stored in digital memory is converted to an analog signal which is magnetically coupled to the read head of the equipment. Additionally, a transducer is embodied in the "tape" edge of a normal cassette; where the transducer presents magnetic signals to the equipment's read head, such transmissions being comparable to those which would have been detected as if magnetic media were being played. The device includes various sensors to detect changes in at least one of the tape equipment mechanisms, including, for example: the tape transport, the capstan, the hub spindle driver(s), the pinch roller, the equipment's read/write head movement, the head assembly, and the erase head.

Information detected by the sensors is presented to at least one of the device's digital processors. Software is included to permit at least one of the digital processors to use the sensor information to direct changes in the magnetic information which is presented to the equipment.

In another exemplary embodiment, the device is similar to that described above, except that instead of using memory cards as the information store, the device has sufficient extra memory to store performances which are to be rendered. The device is configured such that the device memory can be loaded with digital information from at least one source external to the device. Depending on the implementation, such loading may occur during the device's manufacture, as part of the distribution process, or after the user has possession. Furthermore such loading may occur only once, or may occur many times.

In yet another exemplary embodiment, the device provides for "recording" from the equipment, whereby the information is received by the device through the transducer from the equipment's read/write head and is deposited in the information store (e.g., the memory card). In addition, sensors in the device that detect and gather the various states of the equipment's control structure (such as the tape transport, head positioning mechanisms, and the motion of the spindle drive shafts) may be implemented in a vast variety of ways appropriate to the situation—including electrical (for example, armatures, or contact switches), electronic (for example magnetic induction, Hall-effect sensors, pressure sensitive transistors), optical (for example, using light emitting diodes (LEDs) and optical sensors), or even mechanical (for example, using gears and trip counter switches) sensors. Ultimately, signals from the sensors will be presented to the digital processor. The sensors identified above are not intended to be exhaustive as there are many other techniques and variations which those skilled in the art of designing digital or electromechanical devices may elect to apply.

In an additional implementation of the embodiment of the device having integral user controls, a display and headphone connector, the device may also include an integral microphone and/or microphone connector. In this embodiment, the user can use the device for recording on recording equipment and can also use the device as a portable, free standing, digital audio recorder. The user can use the integral microphone, plug an external microphone into the connector or plug in a patch cable connected to the "record output" of an audio amplifier.

In addition to the "information store" memory used to store, for example, a musical performance, whether this storage be removable or non-removable from the device, the device may contain additional memory. For example, a memory used by the processor for "temporary" or "transient" activities, including, depending on the embodiment, one or more storage devices used for:

processing the digital performance data: encrypting or decrypting it, change it from various encoded formats (e.g., MPEG, WAV, etc.) to those more appropriate), change it to a form suitable for the digital-to-analog converter (or, depending on the embodiment and the capabilities of the processor, performing the digital to analog conversion directly), or whatever other interpreting, processing or analysis may be required;

monitoring the recent history of the device's sensors (see the description below of clock 290), and controlling the device accordingly; and regulating the power supply and the flow of power to and from various components of the device, including regulating the flow of power from a generator and/or battery, charging the battery, and determining when various components should receive power, including the processor itself.

Candidates for this type of memory include volatile RAM, or static RAM, which retains its contents only while it is powered. This type of memory is currently economical, although it might involve additional consideration on the part of implementors to insure that only "scratch" information is held here, and to store information to be retained across power outages (if any) elsewhere in more "permanent" memory.

"Permanent" memory may be used by the processor to record the state of the device and the state of the playback during periods when the device is (or is subject to being) without power. Depending on the embodiment, if there is no battery, such times could occur whenever the generator is not being driven by the spindle. For example, saving the position within the performance in order to resume playback (thus mimicking a tape which can be stopped, removed, and thence resumed), and saving the state of the device, and the various components, especially if the device is powered with only a generator and no battery. In this case, the processor could frequently update the permanent memory with "state" information relevant to continuing processing after the power is resumed.

Candidates for this type of "permanent" memory include for example "E-squared" (Electrically Erasable) memory or "Flash" memory. To conserve power, the processor may elect to turn off some (or all) of the blocks of memory when they are unused. Important information could be organized to stay only a subset of the memory blocks to which power is left on.

In summary, the standard equipment, such as an analog cassette player, responds to user actions (such as by operating PLAY, REWIND, FAST FORWARD, STOP, PAUSE, etc. controls) by changing the configuration and speed of its tape transport and read head position, etc. The device has sensors to detect these changes and responds by altering the nature of the magnetic signal which is generated. These sensors can be mechanical, electrical, electronic, optical, or any combination thereof.

BRIEF DESCRIPTION OF THE DRAWINGS

Other features and advantages of the present invention should become apparent from the following description of presently preferred non-restrictive embodiments and from the appended drawings of which.

DETAILED DESCRIPTION OF THE ILLUSTRATIVE EMBODIMENTS

Figure 1:
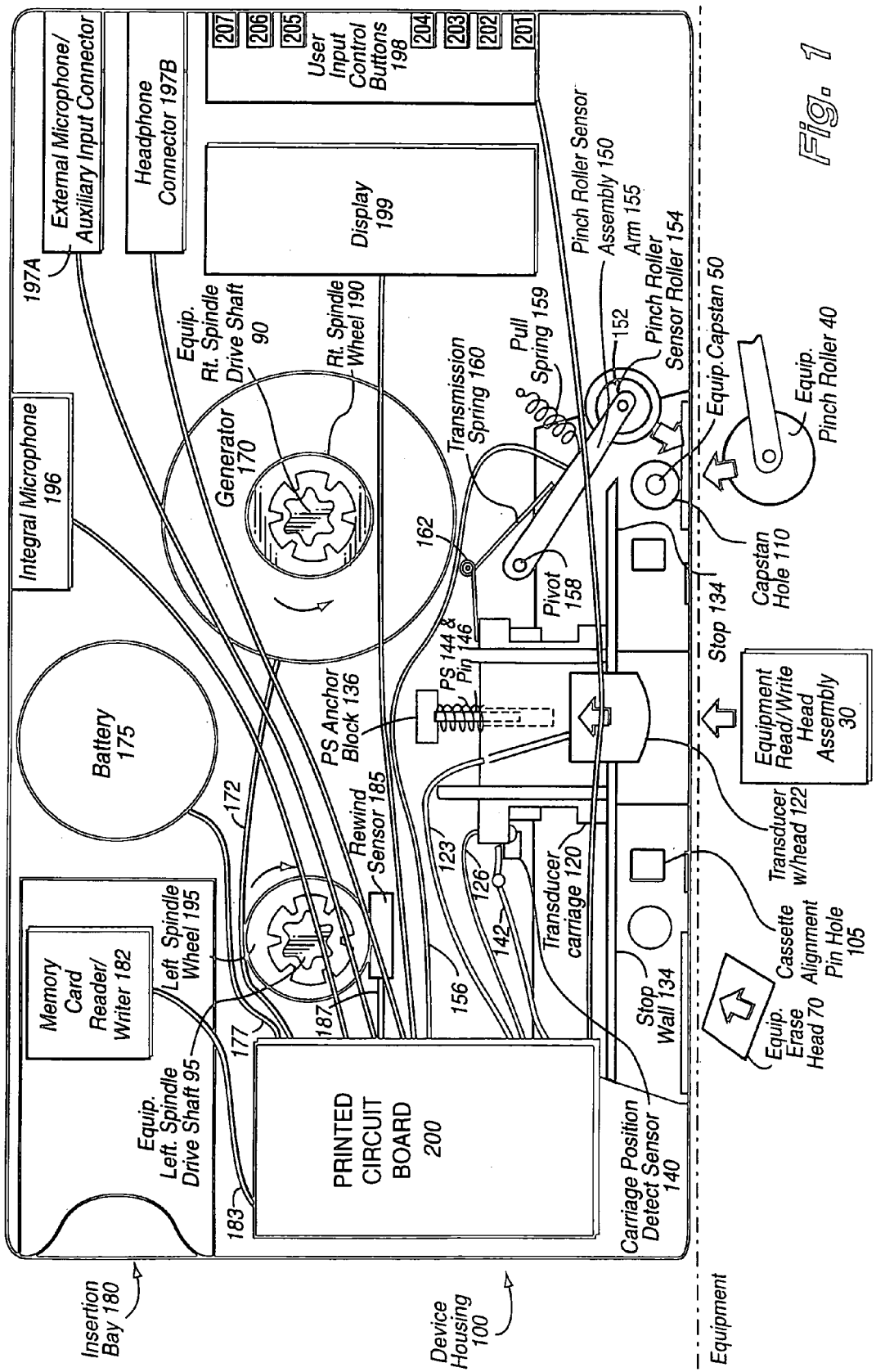
FIG. 1 is an exemplary schematic diagram depicting a device housing embodying a printed circuit board, and a removable memory card and standard playback equipment in accordance with one exemplary embodiment of the present invention.

FIG. 1 shows an exemplary "device" embodied in a housing 100 which emulates a standard commercial audio cassette when inserted into conventional playback "equipment" such as an audio cassette player. As shown in FIG. 1, such an audio cassette player includes read (or read/write) head assembly 30, pinch roller 40, capstan 50, alignment pin (not shown), erase head 70, right spindle drive shaft 90 and left spindle drive shaft 95. The device housing 100 has exterior dimensions and shape similar or identical to a standard commercial audio cassette tape. When the device is inserted into cassette player equipment, the equipment's alignment pin (not shown) fits into cassette alignment pin hole 105. Although the exemplary embodiment does not do so, it is contemplated that some sophisticated embodiments place a sensor near this alignment hole to detect when the device has been inserted into equipment. The cassette player's capstan 50 enters through capstan hole 110.

Figure 3:
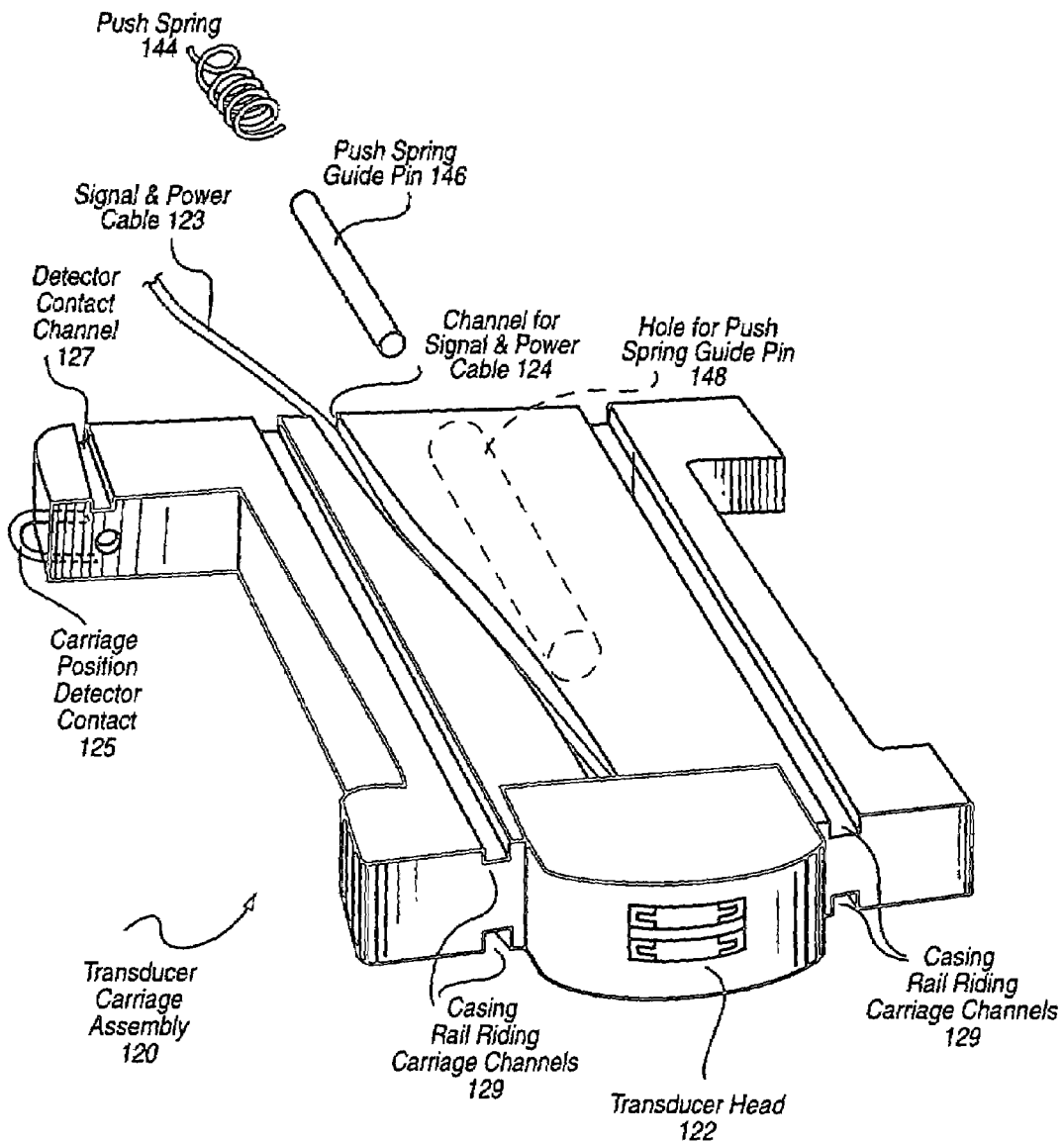
FIG. 3 is an illustrative carriage assembly showing in further detail the assembly shown in FIG. 1.
Figure 5:
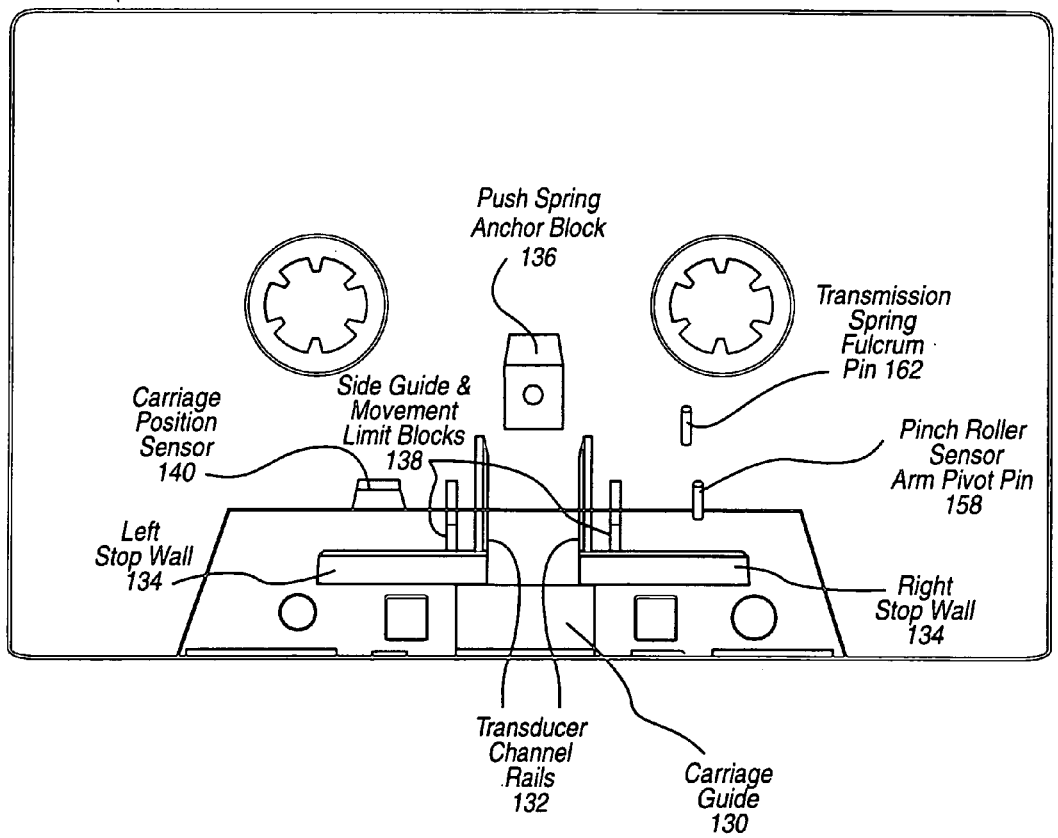
FIG. 5 is a device housing diagram showing various mechanical aspects of an unassembled casing.

The transducer carriage assembly 120 and associated structure are shown in FIGS. 1, 3 and 5. The transducer carriage rides on rails 132 (FIG. 5) in which the transducer carriage channels 129 (FIG. 3) slide. As best shown in FIGS. 3 and 5, movement is bounded in the outward direction by stop wall 134, on the inward direction by guide push spring 144 and push spring anchor block 136, and on the right and left by rails 132 in channels 129. In the exemplary embodiment, movement is additionally restrained in all directions by the side movement limit blocks 138 which limit lateral movement as well inward/outward motion by contact with the carriage flanges.

Figure 2:
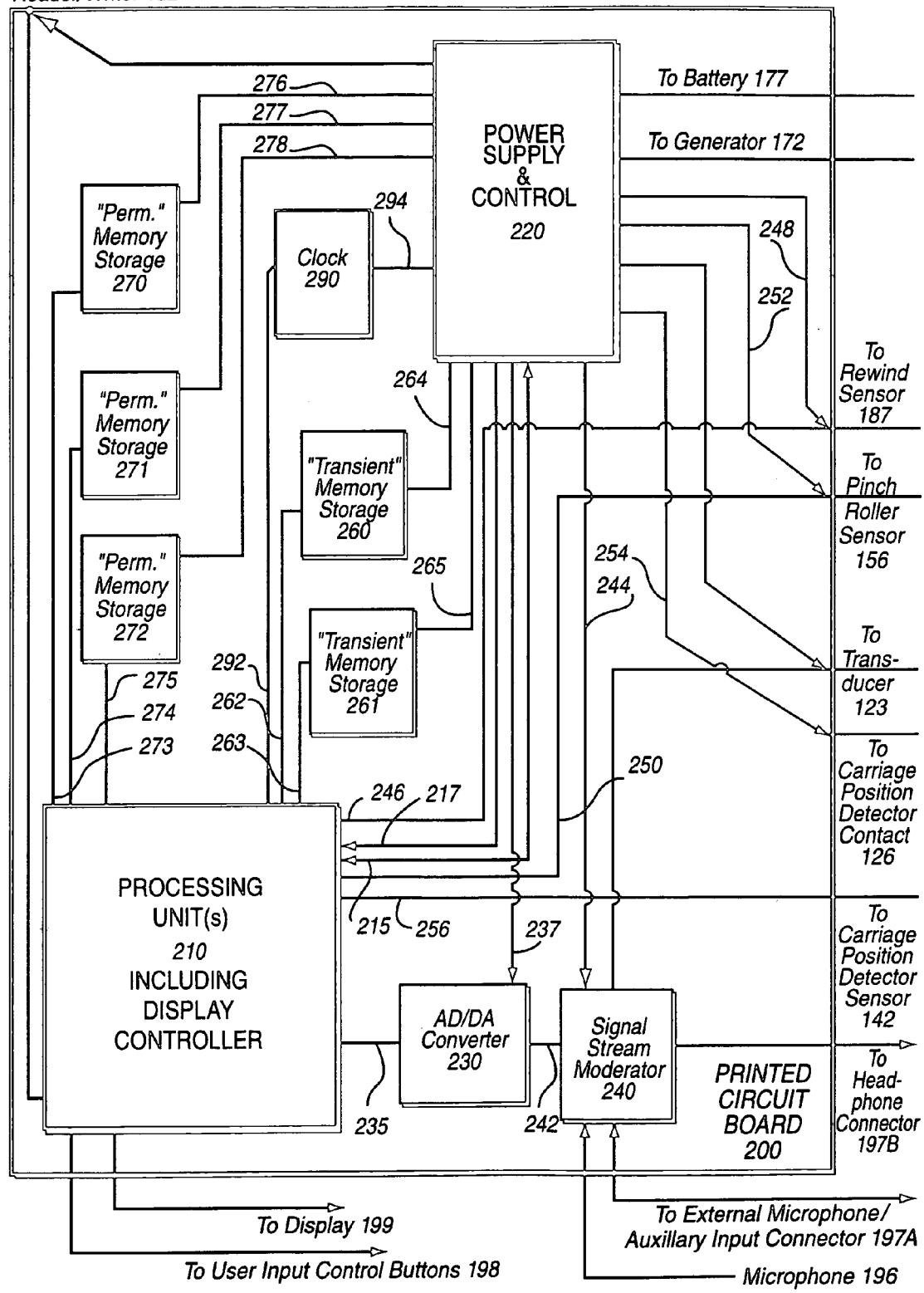
FIG. 2 is an illustrative block diagram of a printed circuit board embodied in the FIG. 1 device housing showing exemplary device electronics.

As shown in FIGS. 1 through 3, transducer head 122 transmits magnetic signals between the cassette player equipment's read (write) head 30 and the processors 210. The signals may encounter additional processing en route in, for example, digital to analog converter 230 and signal stream moderator 240.

A transducer cable 123 carries power to the transducer head 122 and signals between head and PCB 200. As shown in FIG. 3, a channel 124 for transducer cable 123 provides a conduit for the cable 123. A carriage position detector contact 125 (FIG. 3) allows sensing whether the carriage 120 is in forward or backward position. In the forward (outward) position, the contact closes a circuit with the carriage position sensor 140, in the backward (inward) position, the circuit is open.

As shown in FIGS. 1 and 3, carriage position detector contact cable 126 carries power from the PCB 200 to the contact 125. A channel for detector contact cable 127 provides a conduit contact cable 126. Carriage channels 129 ride on the rails 132 (shown in FIG. 5) situated on the casing, and assure proper orientation of the transducer head 122 as its carriage 120 moves forward and backward.

As shown in FIG. 5, carriage guide 130, in which the carriage rides, consists of components 132, 134, 136, and 138 described below. The exemplary embodiment illustrates only one of many ways the transducer motion could be regulated that are within the spirit of the present invention. For example, alternatively, the assembly could be set on a spring loaded lever arm.

Rails 132, which protrude from the casing and guide the carriage channels 129 that ride thereon, allow the transducer carriage assembly 120 to move backward (inward) and forward (outward) while insuring the proper orientation of the transducer head 122. Stop wall 134 runs along the inside of the front of the device and somewhat protects the components of the device. There is gap, or window, in the stop wall in the center of the device through which the transducer head 122 protrudes to contact the equipment's read/write head 30. The edges of this gap serve to limit the forward (outward) motion of the transducer carriage 120, while the right side of the stop wall serves as a stop for the pinch roller sensor arm 155.

Push spring anchor block 136 which, together with the push spring, limit the backward (inward) motion of the transducer carriage 120. Side limit blocks 138 provide additional alignment guidance for the carriage 120—both left and right, augmenting the rail/channel guidance—as well as inward and outward by virtue of the fore and aft flanges on the transducer carriage 120 which further limit its motion.

As shown in FIG. 1, carriage position detection sensor 140 completes a circuit with the carriage position detector contact 125 if and only if the carriage 120 is moved to the forward (outward) position. Carriage sensor cable 142 connects the contact 140 to the PCB 200.

Turning to FIG. 3, push spring 144 is a coiled spring holding the transducer carriage assembly 120 outward unless it is pushed inward by the equipment's read head. It provides pressure against the push spring anchor block 136. Push spring guide pin 146 insures proper orientation of the push spring 144, and keeps the spring positioned squarely between the carriage 120 and the anchor block 136. The inward end of the pin is anchored to the push spring anchor block 136 while the outward end rides loosely in the push-spring guide pin hole. Push-spring guide pin hole 148 in the carriage 120 allows for the guide pin 146 to remain attached to the anchor block 136 while the carriage 120 moves inward and outward.

Turning back to FIG. 1, pinch roller sensor assembly 150 is comprised of the sensor arm 155, the sensor roller 154, the sensor 152, the pinch roller arm pivot pin 158, the pull spring 159, and the roller sensor cable 156. In the exemplary embodiment, this assembly is pressed against the equipment's pinch roller 40 to detect when the equipment expects the tape to be in motion; and the sensor itself is a commutator/armature affixed to the sensor roller 154.

A pinch roller sensor 152 detects when the equipment expects tape to be in motion. Power and signal to and from the sensor 152 is transmitted through the pinch roller sensor cable 156. In the exemplary embodiment, as indicated above, the sensor 152 is a commutator/armature located on the pinch roller sensor roller 154. There are commutator/armature contact and pickup brushes on the sensor arm 134 connected by the cable 156 through which are sent open/closed circuit signals to the PCB 200. The signals switch between open to closed pulses at a substantially expected rate when the pinch roller sensor roller 154 is in contact with a moving pinch roller 40. The pinch roller 40 spins when it is pressed forward against the moving capstan 50. In "normal" cassette player equipment operation, tape is positioned between the capstan and the pinch roller, and this is the mechanism by which tape movement is regulated. Of course, with the exemplary emulated cassette device, there is no tape.

A commutator is only one of a variety of techniques that could be applied by one skilled in the art to implement the sensor. As observed earlier, other techniques include, for example: armatures, magnetic induction, the Hall-effect, optical sensors using LEDs or other light sources, etc.).

A pinch roller sensor roller 154 is part of the sensor mechanism. It is free-wheeling except for commutator contact and pickup brushes (not shown) on the sensor arm 155 which allow for rotational measurement. A pinch-roller sensor arm 155 holds the sensor roller 154. In the exemplary embodiment, the arm has contact and pickup brushes which provide an alternating signal by which the processor 210 can determine the motion of the pinch roller sensor roller 154. The arm 155 is anchored by the pivot 158, and attached to the pull spring 159.

A pinch roller sensor cable 156 which carries power and signal to and from the sensor 152 and the PCB 200 is coupled to the sensor arm 155, and is sufficiently flexible to allow the sensor arm to move as required. The pinch-roller sensor pivot 158 anchors the sensor arm 155 to the casing 100. The sensor arm 155 pivots around this point as the arm is forced outward to contact the pinch roller 40.

Pull spring 159 holds the pinch roller assembly 150 inward when the equipment's head 30 is not engaged. It is anchored to the casing 100 and the pinch roller sensor arm 155. Its strength is such that it yields to the transmission spring 160 which includes a transmission spring fulcrum pin 162 when the equipment's head is engaged and the carriage assembly is pushed inward.

Transmission spring 160 pushes outward the pinch roller arm 155 when the carriage assembly 120 is pushed inward by the engagement of the equipment's read/write head 30. While it transmits inward movement of the carriage 120 to outward motion of the sensor arm 155, it accommodates the fact that different cassette equipment have slightly different configurations and tolerances. In the exemplary embodiment, when the carriage 120 is disengaged (in the outward position), the transmission spring 160 is at rest, when the carriage is engaged, the spring is not only strong enough to overcome the inward retarding effect of the pull spring 159 but it holds the pinch roller sensor roller 154 against the pinch roller 40 with sufficient pressure to make effective contact between the two rollers. Transmission spring fulcrum pin 162 is anchored to the casing 100 and acts a fulcrum, or pivot, for the transmission spring 160.

Figure 7:
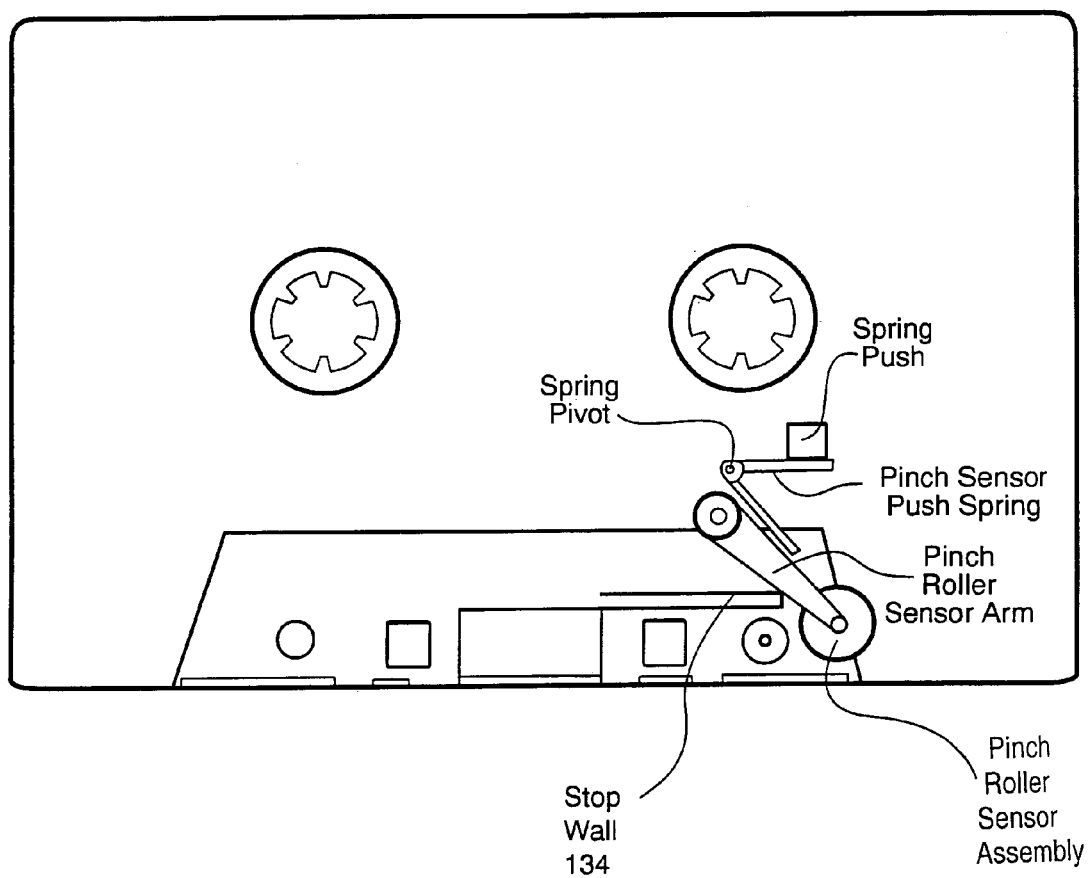
FIG. 7 is a device housing showing an exemplary alternative pinch roller sensor configuration.

Various alternative pinch roller assembly implementations are contemplated herein. One alternative mechanical configuration for a push roller sense arm, pinch roller sensor and spring assembly is shown in FIG. 7. As shown in FIG. 7, the spring assembly includes a pinch sensor push spring, spring pivot and a spring push block.

Generator (alternator) 170 is engaged by the right spindle wheel 190 which is turned by the equipment's spindle drive shaft 90. The generator supplies power to operate the device, and recharges the battery 175, if any. The power is managed by the power supply 220 (located on the PCB 200) to which the generator is connected.

Figure 4:
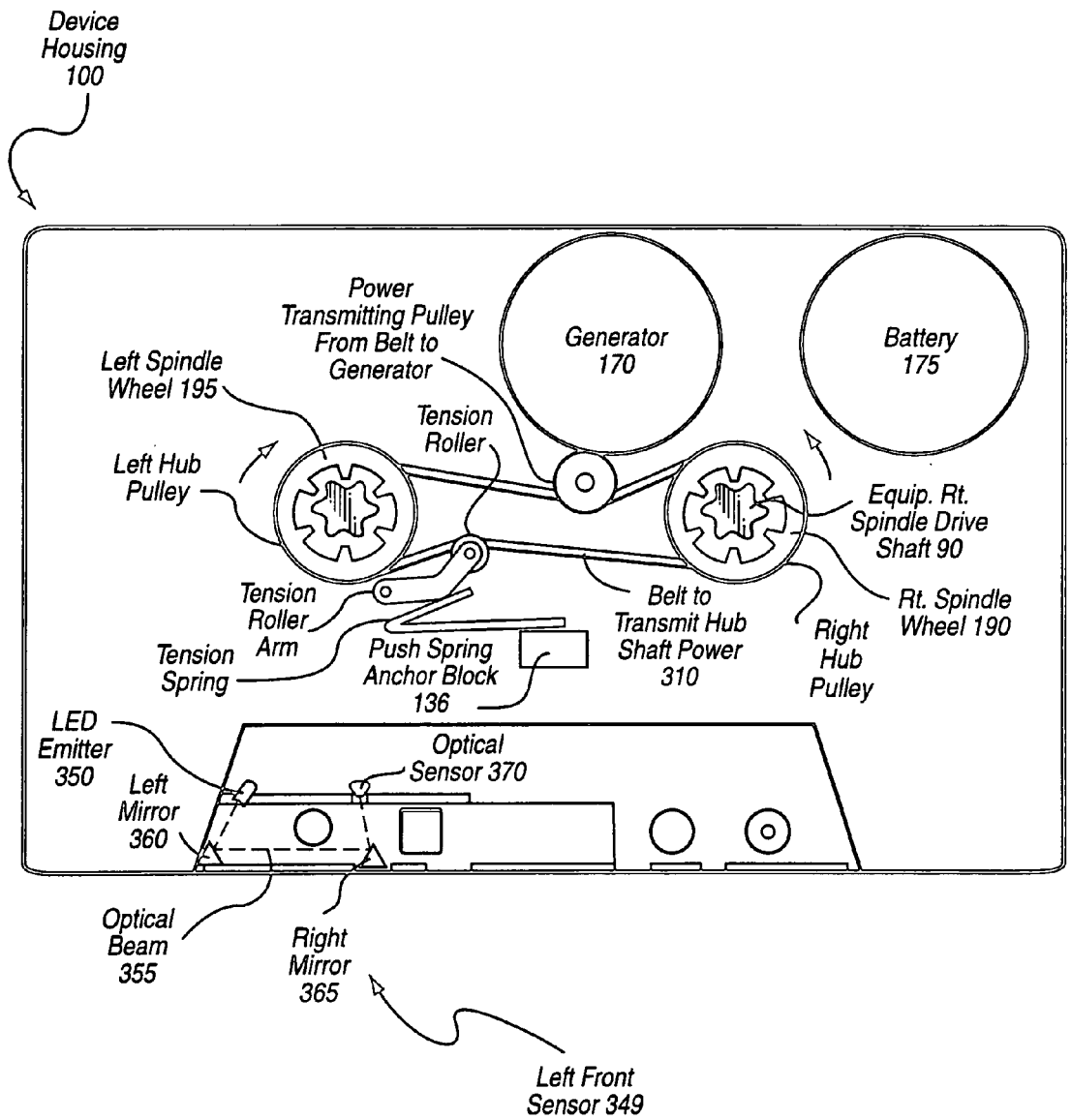
FIG. 4 is another device embodiment illustration having a generator driven by two spindles.
Figure 6:
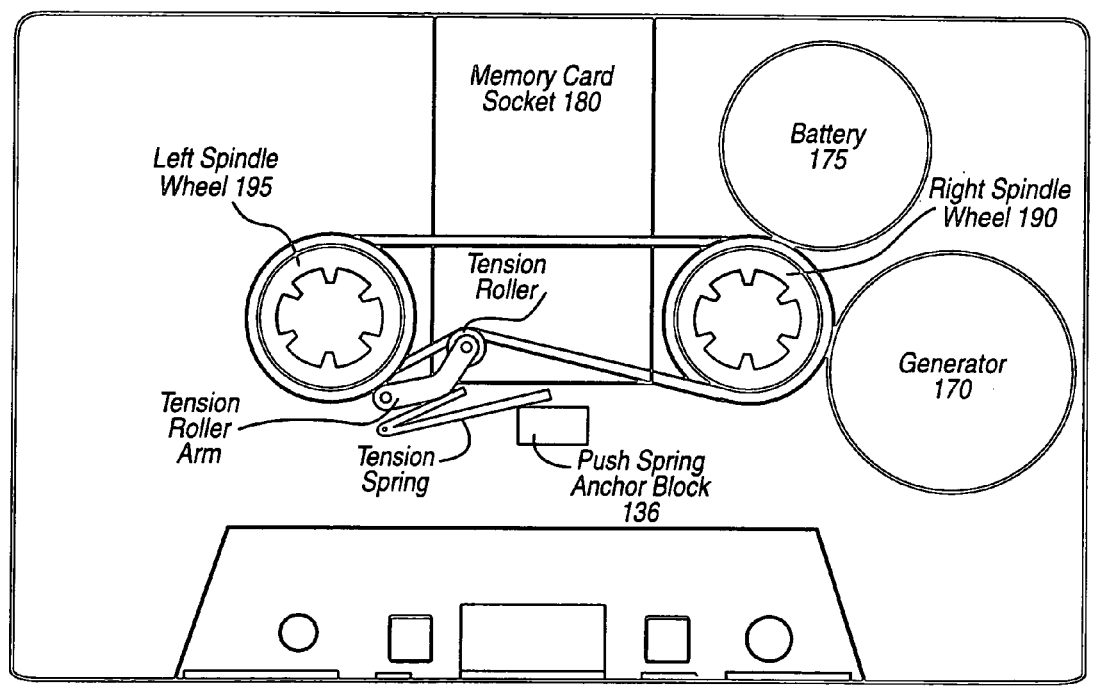
FIG. 6 is a further exemplary embodiment showing an alternative design for the device.

Although the exemplary embodiment drives the generator directly from the spindle drive shaft 90, there are many possible implementations in accordance with the present invention. For example, generator 170 could be driven by gears or belts connected from one or both hub drive shafts. The generator 170 could also be driven from the capstan. FIGS. 4 and 6 are examples of ways belts and/or gears could be used.

The belt 310 in FIG. 4 also serves to link right spindle drive shaft 90 with left spindle drive shaft 95 such that when one shaft is driven in motion the other shaft follows the same motion. This linking of motion serves to overcome sensing mechanisms included in some equipment which monitor proper take up of the tape as it exits the capstan pinch/roller mechanism.

Although the generator 170 is present in the exemplary embodiment, such a generator is not required to be present. For example, it would be feasible to power the device strictly with a battery, capacitor, or other power storage element. For example, without a generator 170, the device could employ batteries. Such batteries could be replaceable, or re-chargeable. In the latter case, which is not illustrated, the device could have a socket device for connecting to an external power source—for example from a wall socket, other batteries, or an automobile's cigarette lighter socket.

Generator cable 172 connects the generator 170 to the power supply 220 on the PCB 200. This cable may contain additional connections, as required for example to sense the speed with which the generator is driven. Generally, the amount of power generated should be sufficient information for the processor 210 (by monitoring signals from the power supply 220) to determine the speed of the spindle's shaft 90. This determination could be useful in cases where the shaft was capable of operating at different speeds, e.g., to distinguish high speed fast forward from regular forward. Depending on the fidelity of the cassette emulation desired by an embodiment, it may be preferable to separately measure the rotation speed.

Although the exemplary embodiment describes only a single generator around the hub driven by the equipment's right (forward) drive shaft 90, in another embodiment generators are present on both hubs. Alternatively, a single generator may be driven by either hub. In the latter case, the generator could be driven by belts or gears connected to the hub, and the position of the generator could be more flexible. Although shown in FIG. 4 as being near the center, as shown in FIG. 6, the generator is positioned to the extreme right as is the battery 175. Having the power transmitted by the "transmission pulley" is only one of a variety of ways the generator assembly could be driven from either hub.

Battery 175 is used to power the device when the generator 170 is not being driven (e.g., when the equipment is "PAUSED"), or in embodiments where there is no generator. The term battery is used generically, to include all manner of power and/or energy storage devices, including capacitors, multiple batteries, etc.

While the exemplary embodiment does use a battery, the invention does not require this, and contemplates embodiments where the device is operated strictly on generator power. In such cases, the processor's logic must account for this and take steps to insure continuity of operation—since power is lost whenever the equipment is not operating the generator. For example, in PAUSE (no spindles are driven) or REWIND operation when a generator is driven only by the right spindle. The right spindle is driven during PLAY, RECORD, FAST FORWARD operations.

Battery cable 177 connects (power) from the battery 175 to the power supply 220 on the PCB 200. The cable may contain additional connections, as required to recharge the battery, or to detect its current remaining capacity.

Memory card socket 180 is the bay into which a removable memory card is inserted. In embodiments not using removable memory cards, this section of the device might include other information storage devices such as additional "permanent" memory (270+) on an enlarged PCB 200. Part of the area may also include a socket (not shown) into which an external communication cable (not shown) could be plugged to download performance information to, for example, a user's PC. In such embodiments, this information downloading would typically be subject to processor 210 control.

Memory card reader 182 interfaces between the external memory when it loaded into the socket 180 and the processor 210 on the PCB 200. Although the exemplary presently preferred device embodiment operates only in "PLAY" mode, other possible embodiments are envisioned which also operate in a "RECORD" mode. In such embodiments the processor writes to memory data based on input received from the equipment head 30 via the transducer 122, or in an additional embodiment, alternatively based on input from an integral microphone 196, an external microphone connected to the external microphone connector 197A or patch cable connected to both the external microphone plug and "record output" of an audio amplifier. In the additional embodiment, in a stand alone play mode, the audio output is coupled to headphone connector 197B for connection to a user's headphones or other external speakers.

Reader cable 183 connects the memory card reader 182 to the PCB 200 and carries power from the power supply 220 and signals to the processor 210. As shown in FIG. 1 rewind sensor (or left spindle wheel sensor) 185 detects rotation of the left spindle wheel 195 when it is driven by the equipment's left spindle wheel 95. In the exemplary embodiment this sensor is implemented as a commutator/armature with contact and pickup brushes. This is not meant to be limiting, and as described herein, a vast number of other types of sensors could be employed instead.

Further, although for reasons of visual simplicity the rewind sensor is not illustrated, in alternative embodiments, such as in FIGS. 4 and 6, where the left 195 and right 190 wheels are coupled, the sensor can be enhanced to detect the direction of motion. For example, if the sensor is a commutator, then the commutator's contacts can have relative varying lengths, giving pulses of relative varying lengths, which are used by the processor to infer direction. For example, the processor can easily distinguish direction based on the whether the repeating sequence with relative ratios :1 (on), 2(off), 3(on), 4(off), is presented forward or backward.

As shown in FIG. 1, rewind sensor cable 187 connects the rewind sensor 185 from the PCB 200 transmitting power from the power supply 220 and signals to the processor 210. Right spindle wheel 190 surrounds the equipment's right spindle drive shaft 90 and transmits its kinetic power to the generator 170. The shaft is driven when the tape is moving forward during PLAY, RECORD, or FAST FORWARD operation. Left spindle wheel 195, surrounds the left spindle drive shaft 95 and is connected to the rewind sensor 185.

Printed circuit board (PCB) 200, which is shown in further detail in FIG. 2, contains many of the electronic components used to monitor, control, and regulate the device. Although the exemplary embodiment illustrates only a single PCB, it is contemplated in a further embodiment to have more than one, or to have its components combined in a way not requiring a circuit board (for example, "hardwired"). In the exemplary embodiment, the digital controls are contained on the PCB, and are more fully described in the description of FIG. 2 below.

Turning to FIG. 2, processing unit 210 monitors and controls many of the device's functions. Although typically a digital processor, it could also be, or be combined with, other types of processing components, such as an AD/DA converter. An additional processor or processors may be employed to perform special purpose processing (such as a cryptographic processors or an MPEG stream encode/decode processor). As explained further below, functions handled by the processor(s) include:

Controlling the power supply 220.

Determining when the battery 175 needs to be recharged from the generator 170 and controlling the power supply 220 to do so.

Receiving input from the information store (the memory card reader 182) in the exemplary embodiment. In alternate embodiments, which emulate "RECORD" mode operation, the processor also manages, converts, and transmits output to the information store (reader-)writer 182 for storage.

Converting information from (/to) the information source 182 into (/from) a form processable by the Analog to Digital/Digital to Analog converter 230 or the transducer 122, or in the additional embodiment processing information from integral microphone 196, external microphone connected to the external microphone/ auxiliary plug input 197A or other analog source connected to the external microphone/auxiliary input plug. As will be appreciated by those skilled in the art, this conversion by processor(s) 210 may include decrypting or encrypting the information, or decoding/encoding to the correct format (from/to MPEG, WAV, etc.) as appropriate.

Transmitting information to/from the AD/DA converter 230 or the signal stream moderator 240.

Handling signals from the transducer carriage position sensor 140 to determine whether the transducer is engaged with the equipment 30.

Handling signals from the pinch roller sensor 152 to determine whether the pinch roller 40 is (being) engaged.

In an additional embodiment, handling signals from user input control buttons 198.

In an additional embodiment, providing display information to a display controller embedded within the processor. Alternatively, the display controller may be incorporated into display 199.

Handling signals from the rewind sensor 185 to determine whether the equipment is performing a REWIND operation.

Handling signals from the power supply 220 to determine the speed with which the generator is being driven. Coupled with the direction, derived from this and other sensors, this information may be used by the logic utilized in connection with the operation of the exemplary embodiments of the present invention.

Determining which elements of the PCB and the overall device should be powered on or off. These elements include: for example the AD/DA converter 230, the signal stream moderator 240, the various memory storage 260, 261, 270, 271, 272, etc., the memory card reader 182, the pinch roller sensor, the carriage position detector contact 125, the rewind sensor 185, and the processor itself.

Turning more specifically to the components and interconnections shown in FIG. 2, power signal connection 215 transmits control signals between the processor 210 and the power supply 220. Signals are sent by the processor 210 to control the power supply 220 in regulating the device's various components (as indicated above). Signals are received by the processor 210 (via 220 in the exemplary embodiment) to monitor, for example, the state of the battery 175, the generator 170 (via 172), an external power source and other components as necessary. Processor power connections 217 transmits power to the processor 210 from the power supply 220.

Power supply 220 regulates the power not only of the PCB components, but also the other device components. As will be appreciated by those skilled in the art, it contains circuitry necessary to smooth irregularities in the generator 170 supply (if the generator is implemented), smooth the battery 175 power (if the battery is implemented), and smoothly transition between the battery, the generator and the external power source as needed depending on a given implementation. It mediates power to the various components, usually under control of the processor. Power supply circuitry responds to signals from the processor 210 to control power supplied to the various other components. This control allows, for example, the battery 175 to be charged, the various memory modules (260+, 270+) to be turned on or off, any other devices to be activated as needed, or deactivated to conserve power when unneeded (especially when the system is running on battery power), and to adjust the power to the processor itself depending on the current needs.

Analog-to-Digital and Digital-to-Analog converter 230 accepts (digital) output from the processor 210 and converts it to analog signals which are coupled to the transducer 122. Converter 230 may be implemented in various conventional ways using either an external component or it could be incorporated as part of the processor 210. In alternative embodiments which support "RECORD" mode, the AD/DA converter 230 also supplies digital signals to the processor 210. The AD/DA signal connection 235 transmits signals between the processor 210 and the AD/DA converter 230. The AD/DA power connection 237 transmits power from the power supply 220 to the AD/DA converter 230. The signal stream moderator 240 amplifies or reduces the signals between the AD/DA converter 230 and the transducer (or integral microphone 196, or external microphone or other analog signal source connected to the external microphone/auxiliary input plug 197A), depending on relative strengths of the input/output signals associated with the AD/DA converter 230 versus the strength of the resulting analog signal needed for the transducer 122. Depending on the implementation of the embodiment and components, this component may be unnecessary or may be combined with other components, for example, as part of AD/DA converter 230. The moderator connection 242 transmits signals from/to the AD/DA converter 230 to the moderator 240. The signal moderator power connection 244 transmits power from the power supply 220 to the moderator 240.

Turning to other FIG. 2 component connections, rewind sensor signal connection 246 transmits signals from the rewind sensor 185 to the processor 210. Rewind sensor power connection 248 transmits power from the power supply 220 to the rewind sensor 185. Pinch roller sensor signal connection 250 transmits signals from the pinch roller sensor to the processor 210. Pinch roller power connection 252 transmits power from the power supply 220 to the pinch roller sensor. Carriage position detector contact connection 254 transmits power to the carriage position detection contact 125. Carriage position detector sensor connection 256 transmits signals from the carriage position detection sensor 140. In the exemplary embodiment this sensor indicates open or closed.

Transient memory consists of one or more modules 260, 261, etc., of "working" memory. Typical candidates include volatile RAM or static RAM. This memory is used by the processor 210, for example, for tasks such as decrypting/encrypting, decoding/encoding or otherwise converting performance information as it is transformed between its state in the information store 182 (e.g., memory card reader) and the AD/DA converter 230. Transient memory signal connections 262, 263 (etc.) transmit information between the respective memory modules 260, 261 (etc.) and the processor 210. Transient memory power connections 264, 265 (etc.) transmit power to the respective memory modules 260, 261 (etc.) from the power supply 220.

Permanent memory modules each consist of one or more modules (270, 271, 272, etc.) of "permanent memory" used by the processor 210, for example, to store status and other information useful across power outages. The particular information stored depends on the particular implementation. These memory modules may, for example, be "E-squared" (Electrically Erasable) memory or "Flash" memory. Permanent memory signal connections such as 273, 274 and 275 transmit information between the respective memory modules 270, 271, 272 and the processor 210. Permanent memory power connections 276, 277, and 278 transmit power to the respective memory modules 270, 271, 272 from the power supply 220.

Clock 290 is used by the processor in one exemplary embodiment as part of its logic to determine the state of the machine. Since elements of the device operate mechanically, such as the transducer carriage 120, the pinch roller sensor roller 154, the spindle wheels 190, 195 and the generator 170—whether or not the sensors are mechanical—it is useful to average events over time, to determine if a particular state is held for a reasonable duration in order that it be deemed effective (for example, if the state of a commutator brush sensor, such as the pinch roller sensor 152 remains unchanged for a certain period, then the processor may deem the corresponding motion to be stopped) to determine the relative duration of states (such as rewind sensor 185 pulses). The rate at which certain states change may be measured to estimate their speed, if any. The clock 290 can also be used by the processor to determine how long various operations, such as rewind or fast forward have taken, thereby allowing an emulated estimate of where a performance should be resumed.

In some implementations, it may be necessary to only run the clock during operation (for reasons just mentioned). In other implementations it may be desirable to run the clock constantly—for example if the performance information downloaded to a memory card is "rented" and intended to be valid for only a limited period (e.g., one month). Thus, processor 210 may be programmed to preclude performance information from being presented to the equipment for "playback" after some predetermined time period has passed.

Clock signal connection 292 transmits clock 290 information to the processor 210. Clock power connection 294 transmits power from the power supply 220 to the clock 290.

PCB 200 is also connected to a left front sensor assembly 349 (shown as components 350–370) which is shown in the FIG. 4 alternative embodiment. The assembly 349 operates to detect the erase head 70 when it is pushed forward during a write operation, and can also detect the pinch roller in "upside down" or "reverse" operation. Although this sensor could be implemented in a variety of ways, the exemplary embodiment shown uses an optical sensor comprising components 350, 355, 360, 365 and 370 described below.

LED emitter 350 emits an optical beam 355, and is connected with a cable (not shown) to the PCB 200, through which it receives power from the power supply 220. Optical beam 355 is generated by the emitter 350. The beam follows a path along the left gap in the front of the device along which the tape would normally travel in a cassette. The left gap is the opening through which the erase head moves forward during write operations to contact the tape (in normal operation); or through which the pinch roller is pushed (in upside-down or reverse operation). Left mirror 360 reflects the beam 355 from its source 350 into its path across the left gap. Right mirror 365 reflects the beam 355 from its frontal path into the optical sensor 370. Optical sensor 370 allows the process to detect whether the beam is able to traverse its path—without being blocked by the erase head 70 or the pinch roller 40. The optical sensor 370 is connected to the PCB 200 by a cable which is not shown. The cable transmits power from the power supply 220, and signals to the processor 210.

Exemplary Modes of Operation of the Illustrative Embodiments

The following discussion of the operation of the exemplary embodiments relates to various aspects including: mechanical, electronic, power supply, roller, transducer, contacts, springs, generator, battery, memory sockets, power regulation logic, and handling the emulation based on equipment behavior.

Mechanical Operational Aspects

Dormant Position:

As best shown in FIGS. 1, 3 and 5, when not inserted into the equipment, the movable elements within the device exist in a "dormant" position. The transducer carriage assembly 120 is positioned through the gap in the stop wall 134 so that the forward edge of the transducer head 122 is just within the casing at or near where magnetic tape would normally be in a standard audio cassette. In the illustrative embodiment, the transducer carriage 120 moves inwards and outwards on channels 129 riding on rails 132 attached to the casing. Carriage movement forward is limited by the stop wall 134 and backward by the push spring anchor block 136, both of which are anchored to the casing. Left and right side guides 138, comprised of vertical guides anchored in the casing, further constrain sideways carriage and backward and forward carriage movement (by impinging the fore and aft flanges on the carriage 120). There are many other ways in which the geometry could be arranged so that the transducer head 122 is maintained in a forward orientation, including the use of channels, tracks, grooves, and mounting the assembly on pivoting arms, etc.

In the dormant state, the push-spring 144 pushes forward, insuring the transducer assembly is held forward against the stop wall 1.134 and the carriage contact 125 is closed with the carriage contact sensor 140. One end of the spring 144 rests on the anchor block 136. The push spring pin 146 is anchored on the block 136 and is inserted into the push spring guide hole 148. The (coiled) spring shown in the exemplary embodiment is only one of many different types of techniques that could be used to hold the carriage forward (another choice might be a simple hairpin spring). There are a variety of ways in which the nominal pressure of the transducer head could be maintained forward against equipment head 30, and various means by which the inward motion of the read head 30 could be detected, allowing for varying tolerances of the equipment geometry.

The pinch roller sensor assembly 150 and its components have been described earlier. In the dormant state the transmission spring 160 applies little or no pressure on the sensor arm 155 which is held inward by the pull spring 159.

In the dormant state, neither hub wheel 190, 195 is driven by the equipment spindle drive shafts 90, 95. The clock 290 may be powered if desired or important in connection with the particular embodiment.

Activating the Device

Upon inserting the device into equipment, the device is seated and the equipment alignment pin (not shown) protrudes into the cartridge alignment pin hole 105, the equipment's left and right spindle drive shafts 90, 95 protrude into the device's respective hubs wheels 190, 195.

Different aspects of the device are activated by the equipment depending on the operation.

The various states which exist when as the exemplary equipment—audio cassette player—performs various operations:

Play

The equipment read head 30 is pushed forward (inward) against the transducer 122 and transducer carriage 120, the pinch roller 40 is pushed forward toward and against the equipment's capstan 50 and the device's pinch roller sensor roller 154, and the right spindle drive shaft 90 and capstan 50 are spun up, although not necessarily in the order described.

Pushing the carriage 120 inward with enough pressure to overcome the outward force of the push spring 144 has at least two effects: First, in one implementation, it separates the carriage position detector contact 125 and the carriage position detector sensor 140. When this circuit is subsequently tested by the processor 210, it will be found open, from which the processor determines the carriage's 120 inward position.

In an alternative implementation, such as is most clearly shown in FIG. 3, the sensor and contact could be mounted in a different position so the contact is open in a dormant state, and pushed closed when the device is activated.

Second, inward carriage 120 movement exerts pressure on the transmission spring 160 which overcomes the relatively weaker retarding force of the pull spring 159 thereby pushing the pinch roller arm 155 and the pinch roller sensor roller 154 outward to contact the pinch roller 40.

For normal magnetic media, moving the pinch roller 40 forward has the effect of holding magnetic tape against the capstan 50 to regulate the tape's motion. Instead, with the present device, the pinch roller 40 drives the pinch roller sensor roller 154 which allows the processor to determine intended tape motion, and even estimate the speed, if it should be deemed important.

It is possible that other exemplary embodiments of the invention could detect the forward movement of the pinch roller 40 by other mechanisms, including for example optical sensors. While this may not allow measuring the speed of the pinch roller, this could be coupled with sensing movement of the right drive shaft 90 and allow the processor 210 to determine the equipment is either in play or fast forward mode. Embodiments supporting the "RECORD" operation, further sensors (e.g., shown in FIG. 4), for example contact switches or optical switches, near the erase head 70 would allow the processor to distinguish between equipment PLAY and RECORD operations.

When the right spindle drive shaft 90 spins up, it turns the right spindle wheel 190 which activates the alternator/generator 170 or, in embodiments without a generator, a "forward sensor" allowing the processor to detect a PLAY, FORWARD, or RECORD operation.

If, as in the exemplary embodiments, the generator is implemented, the spinning right drive shaft 90 causes it to generate a current transmitted through cable 172 to the PCB 200. The current acts both as a power source for the PCB and a signal to the power supply 220 to activate or signal the processor 210 that forward shaft motion is underway.

Switching circuits in the power supply allow it to immediately switch between the battery 175 and generator 170 depending on whether or not the generator 170 is active. The power supply 220, possibly in conjunction with supervisory signals from the processor 210, can recharge the battery 175 whenever the generator 170 has sufficient excess current.

Even if the device is powered strictly by one or more batteries 175, et al., then the spindle wheel 190 can be coupled to a sensor (not shown) to detect when the shaft 90 spins. This signal therefrom can be used by the power supply 220 to activate the processor 210 if it is dormant, or to signal the processor 210 if it is already active. In this case, the drive sensor may be coupled more directly to the processor 210 rather than indirectly through the power supply 220.

Once the processor is active, and has determined that the right drive shaft 90 is turning, the carriage 120 has been pushed inward, and the pinch roller 40 is moving, it can determine that either a PLAY or RECORD operation is underway. If the processor determines equipment erase head 70 is in the outward position, the processor then determines it is in the PLAY operation. It then determines the point at which to start (or resume) playing a musical or other performance stored in the information store. If the information store is embodied as a memory card, and one is loaded in the memory card socket 180, then the performance data is acquired through the memory card reader 182.

Other messages that can be played in PLAY mode—for example announcing the current "position" of the emulated tape, or to announce other control of status information, such as the fact that a performance is not available, or other, more elaborate "AudioMenus". These features are discussed later in the "Special Operations" section.

The current state of the performance—for example position, volume or other characteristics—could be stored in a pre-determined (although not necessarily fixed) location on the memory card. If sufficient "permanent" onboard memory were available it is also be possible to store in the "latest" position of several memory cards, with a few state characteristics unique to each, thus allowing the cards to be switched, without altering their "state". This allows each memory card to emulate a cassette, with the current position being remembered either in the device or in the card itself.

PAUSE Operation

Typically equipment is designed so PAUSE occurs only during PLAY or RECORD mode, although some equipment may allow PAUSE to occur during other operations such as REWIND and FAST FORWARD. This state is characterized by the read/write head 30 positioned forward against the transducer 122, and both spindle drive shafts 90, 95 halted. Depending on the equipment, either the capstan 50 is halted, the pinch roller 40 is held outward, away from the capstan 50, or both.

With the pinch roller 40 stopped—because it is retracted from the capstan 50 and/or the capstan 50 itself is stopped—the device's pinch roller sensor roller 154 is (or becomes) motionless. Approximately simultaneously, the generator 170 stops (if it was spinning) because the drive shaft 90 is stopped or stopping.

In embodiments lacking a battery, the PCB 200, the power supply 220 and all other device components lose power, the processor 210 maintains frequent checkpoints, e.g., once every second or so, during PLAY, or other operations, of the "state" information regarding position of, and other aspects which may be pertinent to, the current performance. This checkpoint information allows the processor 210, when power is again restored to the device, to resume from approximately the same point of play. In embodiments without a battery, capacitor, or other power source, it may be difficult for the device to distinguish between PAUSE and STOP.

In embodiments with a battery 175, the power supply 220 circuitry seamlessly draws power from the battery 175 to provide smooth continuous power device whenever the generator 170 power lags. In this case, the processor 210 continues to operate during PAUSE mode and transition thereto, and is able to provide additional emulation features.

In this case, the processor 210, which monitors incoming sensor signals, detects several events, more or less simultaneously, with timing allowance made for the mechanical nature of the device mechanism:

a signal from the power supply 220 indicating generator 170 power is lagging—this suggests the equipment is transitioning into another state, typically PAUSE, STOP, or REWIND;

cessation of expected periodic changes in the signal from the pinch roller sensor 152 (which is implemented as a commutator/armature in the exemplary embodiment) indicating the pinch roller sensor roller 154 has stopped-because the pinch roller 40 is pulled away from pinch roller sensor roller 154, or, in any case, even if the particular equipment does not pull back the pinch roller, because the capstan 50 itself is stopped (or stopping);

that the signal from the carriage position detection sensor 140 shows the switch remains open indicating the transducer carriage 120 remains in the inward position—from which the processor 210 infers the equipment is in a PAUSE rather than a STOP operation.

The processor 210 can use this opportunity to record the present state of play (e.g., to permanent memory 270), and to adjust the power of various components not required for PAUSE operation. If no other action is needed, the processor 210 can even take this opportunity to shut itself down.

Although PAUSE is somewhat similar to STOP, it is also possible for the device to use this distinction in special ways—such as described in the section "Special Operations".

STOP Operation

While STOP can be initiated from almost every other state (PLAY, RECORD, PAUSE, REWIND, and FAST FORWARD), the events are similar to those of PAUSE (see the above "PAUSE" section for details), except that the equipment moves the head 30 outward restoring it to the dormant state. This difference is a means by which a battery-powered embodiment can distinguish the two states. The processor behavior generally follows the same lines as PAUSE, except that an allowance must be made that STOP can occur from other than PLAY or RECORD states, so that additional considerations exist beyond recording the "current" performance state—for example some embodiments may be programmed to interpret STOP during REWIND as an indicator to re-reposition the performance to its beginning, while others may choose to estimate an emulated tape position based on duration of the rewind state. Such considerations are described more fully later.

FAST FORWARD Operation

This state is indicated by the right spindle drive shaft 90 running (counter-clockwise as always) at (usually) a faster speed than normal. With most equipment the other elements are in their dormant positions: the head 30 is in the outward (back) position away from the transducer 122, the pinch roller 40 is outward away from the capstan 50 and the pinch roller sensor roller 154, and the erase head 70 is in the outward position. Depending on the equipment, the capstan 50 may or may not be spinning.

This state can be detected even in embodiments lacking a battery 175, since, in this case, the generator 170 must be driven by the right spindle 90 in order to power the device for PLAY, which is anticipated even in the most basic embodiments.

Most equipment allows the FAST-FORWARD operation to be initiated from any other state—so the processor 210 must account for this possibility when it recognizes state transition (i.e., embodiments can provide logic to decide whether the current position is to be saved or not, etc.).

In one preferred embodiment, the processor uses the clock 270 to measure duration of the FAST FORWARD state—and from this to estimate an emulated "tape" position. Embodiments without an external clock can simply count iterations through a loop to estimate the elapsed time. Further, depending on the desired degree of emulation fidelity, it is possible to estimate the speed with which the drive shaft 90 spins—either from a direct sensor (not illustrated), or from the level of power generated 170, such level can be determined within the power supply 220. It is contemplated that in a further embodiment, the device may emulate the accelerating effect of the tape wrapping on the reel which increases the diameter of spiral, and therefore the effective tape speed, as the position of the performance advances.

While the device can emulate FAST FORWARD strictly, it is also possible for an embodiment to use other "smarter" means of tape re-positioning. Examples of such techniques are discussed in "Special Operations".

In embodiments without a battery 175, processor 210 frequently saves the position state attained by the FAST FORWARD emulation (and that that is the operation underway) in "permanent" memory, since transition to another state especially STOP, PAUSE or REWIND—but with some equipment even PLAY or RECORD—will cause the power to momentarily cease.

REWIND Operation

This state is indicated by the left spindle drive shaft 95 running (clockwise as always). With some equipment, this is the only time the left spindle drive 95 runs. With most equipment the other elements are in their dormant positions: the head 30 is in the outward (back) position away from the transducer 122, the pinch roller 40 is outward away from the capstan 50 and the pinch roller sensor roller 154, and the erase head 70 is in the outward position. Depending on the equipment, the capstan 50 may or may not be spinning.

In embodiments lacking a battery 175, this state cannot be detected unless the left drive spindle 95 also drives a generator. In basic embodiments where neither is available, backward positioning may still be accomplished, by emulating a "circular" tape, where the ultimate FAST FORWARD effects a REWIND to the start. REWIND may also be assumed whenever the equipment loses power.

Embodiments with a battery 175, or with a generator 170 driven by the left spindle drive 95 will now be described. Most equipment allows the REWIND operation to be initiated from any other state—so the processor 210 must account for this possibility when it recognizes state transition (i.e., embodiments can provide logic to decide whether the current position is to be saved or not, etc.).

In one preferred embodiment, the processor uses the clock 270 to measure duration of the REWIND state—and from this to estimate an emulated "tape" position. Embodiments without an external clock can simply count iterations through a dispatcher loop to estimate the elapsed time. Further, depending on the desired degree of emulation fidelity, it is possible to estimate the speed with which the drive shaft 95 spins—either from a sufficiently capable direct sensor, or from the level of power generated 170, such level could be determined within the power supply 220. It is contemplated some further embodiment may emulate the accelerating effect of the tape wrapping on the reel which increases the diameter of spiral, and therefore the effective tape speed, as the position of the performance proceeds.

While the device can emulate REWIND strictly, it is also possible for an embodiment to use other "smarter" means of tape re-positioning. Examples of such techniques are discussed in "Special Operations".

In embodiments without a battery 175, but in which a generator 170 is powered by the left spindle shaft 95, it is incumbent on the processor 210 to frequently save the position state attained by the REWIND emulation (and that that is the operation underway) in "permanent" memory, since transition to another state especially STOP, PAUSE or FAST FORWARD—but with some equipment even PLAY or RECORD—will cause the power to momentarily cease.

RECORD Operation

The equipment in this state is very similar to that in PLAY (see description thereof), except that the equipment's erase head 70 is moved forward (inward) to erase tape before traveling under the write head 30: the (read-)write head 30 is pushed forward (inward) against the transducer 122 and transducer carriage 120, the pinch roller 40 is pushed forward toward and against the equipment's capstan 50 and the device's pinch roller sensor roller 154, and the right spindle drive shaft 90 and capstan 50 are spun up, although not necessarily in the order described.

In order to distinguish between RECORD from PLAY, in accordance with the illustrative embodiments, the device senses when an erase head 70 moves forward. FIG. 4 shows such a sensing system. For variety, an optical sensor is illustrated here, although this is not intended to be limiting—a designer of ordinary skill has a vast assortment of possible techniques and arrangements from which to choose. However, as shown, the LED (Light Emitting Diode) 350 emits a beam 355, which strikes the left mirror 360 moving horizontally across the front interior of the device in the same path (or slightly forward thereof) that would be occupied by taut tape in a normal cassette, striking the right mirror 365 and finally hitting the optical sensor 370. Appropriate gaps are present in the stop wall 134 to accommodate the beam, unless the wall is transparent to its frequency.

Of course both the LED 350 and the sensor 370 are attached by cables (not shown) to the PCB 200, with power being supplied to both from the power supply 220 under control of the processor 210. The sensor cable also transmits signals to the processor 210 indicating whether or not the beam is visible.

In RECORD mode, the equipment moves the erase head 70 inward blocking the beam 355, which is perceived by the sensor 370 and signaled to the processor 210, where it can be tested as needed. The power supply 220 may be used to regulate power to the LED source 350 and sensor 370 activating them only as necessary at transition times to distinguish PLAY or RECORD operations.

When all the elements are in place, the transducer 122 accepts magnetic signals emitted from the write head 30, which are processed as needed by the signal modulator 240, digitized by the AD/DA converter 230, and read by the processor 210. They are converted to the output format appropriate to the embodiment, including for example encoding or encryption. In the exemplary embodiment the results are written to the memory card through the memory card reader/writer 182.

The current state of the output—especially for example position—could be stored in a pre-determined (although not necessarily fixed) location on the memory card.

REVERSE Operation

Some equipment, especially for example in automobiles where there is no RECORD feature, support the REVERSE operation. This allows the "other side" of a tape to be played without removing the tape and turning it over. To perform this operation, in addition to the illustrated RIGHT capstan 50 and RIGHT pinch roller 40, the equipment has a LEFT capstan (not shown) and a LEFT pinch roller (not shown). These two are roughly symmetrical with their RIGHT counterparts 40, 50.

The behavior and actions during REVERSE operation corresponds to that when the device is inserted into the equipment "upside down". That discussion follows.

UPSIDE DOWN Detection

Ideally, the device should be able to distinguish when it is inserted upside down into basic equipment that may only move the tape left to right (by driving the right spindle 90), or when the device is inverted into bi-directional equipment which is currently in REVERSE state.

When PLAYing or RECORDing while UPSIDE DOWN or REVERSE, the LEFT pinch roller is pushed forward against the LEFT capstan both of which are spinning as is also the LEFT spindle drive shaft 95; the head 30 is forward (inward), while the RIGHT pinch roller 40 is retracted and, like the RIGHT spindle drive shaft 90, is still.

The processor 210 can distinguish this condition by detecting that the transducer carriage position sensor 140 is open, and that the LEFT spindle wheel sensor 185 detects left shaft 95 motion or clockwise motion of the belt 310.

To monitor the LEFT pinch roller, it is possible for the device to have additional symmetrical sensors similar to the exemplary RIGHT pinch roller sensor arm assembly 150 that monitors the RIGHT pinch roller 40. However, in embodiments such as the Simplified Embodiment described below, this may not be necessary.

Depending on how expensive and elaborate one wishes to make an embodiment to be, there are a variety of ways the device could handle the REVERSE feature when it is encountered. There are many courses of action possible. For example, (1) If the device is not equipped with sufficient sensors, and cannot detect this situation, then the processor will not distinguish this from the STOPped state, and thus not produce audio output.

(2) If the device has sufficient sensors to detect the condition, and has a battery 175 but the generator 170 is driven only by the right spindle 90, then in accordance with the embodiment, the user may be directed to play the "other side" of the device, in order to insure the battery is conserved. Since the equipment is ready to receive messages from the device, the device simply generates the message "please turn the cassette over and play the other side". Ideally the information from which to generate the message is stored in the device's permanent memory and is not related to any particular performance.

(3) if the device has sufficient sensors, and the generator 170 is powered by both spindles, the processor 210 may proceed to operate.

In handling both directions, processor logic takes into account that during REVERSE and UPSIDE DOWN operation the significance of REWIND and FAST FORWARD is inverted from the descriptions otherwise accorded herein. Thus, for accurate emulation, the processor 210 keeps track of the direction in which play is occurring.

Also, a two-sided tape may be emulated, even to the point of simulating half the performance on one logical side and half on the other. However it is more desirable to treat the device as a single long tape with interchangeable sides and lift the burden of switching sides from the user. One possible complication with this approach is that the user may insert the device into equipment without using PLAY and performs, say, a REWIND (which is perfectly natural). In such case, the device uses whatever previous orientation (up or down) was stored in its permanent memory during its last use, and thus treat REWIND as FAST FORWARD. Since the user has no way to visually know the orientation of the device, there is no way to know that the nominal UP side will correspond to its behavior. It is possible to address even this consideration by having yet additional sensors to determine when the device is removed from or inserted into equipment. Such a sensor might test the alignment pin holes 105 to determine when the device was inserted or removed from the equipment. The stored UP/DOWN status could be reset to UP whenever the device is inserted or removed.

Simplified Embodiment: The exemplary embodiment illustrates at least one pinch roller sensor roller assembly 150 which, together with the other features illustrated and described herein, provide a mechanism for closely detecting all aspects of the equipment which contact the device. In many cases, not all of the sensors may be necessary to distinguish the intended states. However this redundancy is provided, in part, because among the huge variety of existing equipment, some may manage tape movement in different ways. It has therefore been considered prudent to develop a variety of ways by which the device can test the equipment's state.

However, a reduced version of the device, possibly with fewer sensors and moving parts, is likely to perform nearly as well for almost all equipment and possibly be more economical to produce. The following is an example of a simplified alternative device embodiment differing from the exemplary embodiment in these ways:

- The pinch roller sensor assembly 150 of FIG. 1 together with the transmission spring 160 and attendant cables are absent.
- The elements of FIG. 4, by which a generator is driven from both hubs via a belt-or pulley linked mechanism, are present, together with all attendant (but unillustrated) power, signal and control cables.
- The left wheel "rewind" sensor 185 of FIG. 1 is present, and is capable of distinguishing left-wheel driver activity by distinguishing whether the belt is moving clockwise (left driven) or counter-clockwise (right driven).
- The left front sensor 349 of FIG. 4 with all aspects 350, 355, 360, 365, 370 are present together with necessary power and signal cables (not shown) to the PCB 200.
- A right front sensor (not shown), comparable to the left front sensor 349 is added, also together with necessary power and signal cables (not shown) to the PCB 200.
- The PCB 200 and cable additions and deletions necessary to support the modified equipment are effected.

In this Simplified Embodiment, the following summary shows the sensor states by which the processor distinguishes the various equipment operations:

PLAY
  carriage inward;
  AND right wheel 90 driven.
  AND NOT left front sensor 370.
  Set reverse FALSE.

PLAY
   carriage inward;
   AND left wheel 95 driven;
   AND NOT right front sensor (not shown).
   Set reverse=TRUE
RECORD
   carriage inward;
   AND right wheel 90 driven.
   AND left front sensor 370.
   Set reverse =FALSE.
RECORD
   carriage inward;
   AND left wheel 95 driven;
   AND right front sensor (not shown).
   Set reverse=TRUE
REWIND
   NOT carriage inward;
   AND reverse=FALSE;
   AND left wheel driven.
REWIND
   NOT carriage inward;
   AND reverse=TRUE;
   AND right wheel driven.
FAST FORWARD
   NOT carriage inward;
   AND reverse =FALSE;
   AND right wheel driven.
FAST FORWARD
   NOT carriage inward;
   AND reverse=TRUE;
   AND left wheel driven.
PAUSE
   carriage inward;
   AND NOT left wheel driven;
   AND NOT right wheel driven
STOP
   NOT carriage inward
   AND NOT left wheel driven
   AND NOT right wheel driven Additionally, if an embodiment wishes to ignore RECORD operations, the left front sensor 349 and right front sensor (not shown) can be omitted, together with the corresponding processor tests thereof.

In detecting the sensor states identified above, it is noted that the state of:

carriage 120 inward is detected by sensing the carriage position detection sensor 140 in the open state, left wheel driven is detected when the "left wheel sensor" 185 detects the belt moving with clockwise sense, and right wheel driven is detected when the "left wheel sensor" 185 detects the belt moving with counter-clockwise sense or in some embodiments generator 170 is activated.

The left front sensor 370 is used during to determine whether the erase head 70 has been moved forward when the tape is moving under the head in UP mode.

The right front sensor (not shown) is used during to determine whether the erase head 70 has been moved forward when the tape is moving under the head in DOWN mode.

Reverse is a logical (TRUE, FALSE) indicator stored by the processor 210 in memory which is set during last known PLAY or with respect to the REWIND operation, it is set TRUE if the carriage detect sensor 140 is "open"—showing the carriage has been pushed inward; otherwise it is set FALSE.

In accordance with a further embodiment additional physical switches and controls on the emulator device provide an the additional, or alternative means of controlling device operation. For example, without limitation, such controls include switches to advance the device to a next selection of the suite of selections loaded into the device;
   position to the first selection of the suite;
   position to a preset particular selection;
   control the mode by which the device chooses selections—for example
      provide for sequential selection
      provide for "random" selection
      provide for selection based on a style which has been pre-specified. For example, such style might consist of predetermined rules established by the user through a computer program interface, such rules being stored on memory related to the suite content, and loaded into the device. For example such pre-specification could include rules which were loaded into the device in conjunction with the suite. For example, such rules might include "weights" assigned to various selections that bias device playback to favor some selections over others Special Operations: Because the preferred embodiment of the invention has a digital processor and is "smart", it is possible to provide additional features not available with "dumb" media such as magnetic tape.

Two such features in the exemplary embodiment have been identified as "AudioMenu" and "smart positioning"—the latter being a subset of the former. AudioMenus provide a way for the user to control aspects of the device, and the current performance—including smart-positioning which allows easier and more accurate positioning than hit-and-miss REWIND and FAST FORWARD tape searching.

The following exemplary description of AudioMenus is intended to be instructive and illustrative but not exhaustive.

AudioMenus allow the user to select and control features (such as the tape position) based on verbal menus supplied by the device and enunciated through the equipment. Since standard equipment typically only has a few controls available (such as PLAY, RECORD, PAUSE, FORWARD, REWIND and STOP), the device interprets special combinations of these as triggers. For example:

To invoke AudioMenu while PLAYing a tape, the user operates the sequence, say, PAUSE-PLAY-PAUSE-PLAY in quick succession. Whatever special sequence is used could be atypical of standard operation, and is recognized as special by the processor 210 and causes it to activate the AudioMenu feature:
      The normal performance is suspended with its current position noted in "permanent" memory.
      The processor 210 accesses stored audio information relating to the Smart Menu;
      The information is expanded (for example, from "text" to voice generation) as needed and presented to the AD/DA converter 230 instead of the performance;
      The equipment then enunciates the associated audio.
      This information consists of a series of "spoken" options.
   In the exemplary embodiment, the user selects the desired option by operating PAUSE as it is enunciated. Each option is followed by a beep, and the option is selected when the user presses PAUSE anytime after, for example, a quarter second after the option enunciation starts, and before a half second after the signaling beep following the enunciation. These periods are parameters which can be adjusted by the user.

When an option is selected, the processor takes the required actions corresponding to the option. For example, such actions could include
  starting another AudioMenu—either a new, deeper menu, repeating the same menu, or returning to a previous menu;
  changing the position of the performance—e.g., going forward or backward, going to a specific point, going to the beginning or end, going to a previously noted position in the performance, etc.
  changing to another song or "track". This could be done by relative position (next, previous, etc.), by absolute number (song number one, . . . ), or by enunciated name: "The Way We Were", "Lara's Theme", etc.
  returning to the performance;
  canceling the most recent re-positioning operation, or series of operations.
  changing the sound quality, or rendering quality: for example, processing the sound with various filters—giving it so-called "Big Theater Sound", or "Outdoor Jamboree" sound, etc. This would require filtering and reverberation signal processing in the processor 210, or auxiliary processor.—or simply changing the overall volume (although usually this could be done easier with the standard equipment volume control).
  changing the performance speed—e.g., running it in multiple speed forward scan. This would require signal compression processing.
  reviewing or setting parameters controlling the AudioMenu system itself and its menus. For example, this could include setting various time and threshold parameters, of setting whether "terse" or "verbose" menu items are to be used; whether extra help suggestions and hits are to be included in menus; of setting what language is to be used;
If no option is selected, then the processor takes a default action (which again might be a user adjustable parameter) such as for example: resuming the performance—repeating the same menu; issuing special audio instructions (e.g., advising the user on how to use the AudioMenu feature, or how to escape back to the performance); returning to the previous menu. The resumption of normal play can be associated with an announcement of the media position when normal play is stopped. If the performance is resumed, the position at which it is resumed may be based on the last moment "n" uninterrupted seconds of normal play occurred. This would enable the user to stop the system and forward or reverse space and play the media for up to "n" seconds without losing the original place. For example, this would allow a "base" position to be retained while the user navigated through the tape listening to up to "n" (say n=10) seconds of samples without disturbing the base location.
The processor makes appropriate timing allowances to accommodate human response time.

A sample series of AudioMenu starting with a "main menu" follows:

After the user presses PAUSE-PLAY-PAUSE-PLAY: in the example six second window interval, the processor stops the current performance; stores its current position for later reference; and commences to generate the following words (which are interrupted when the user makes a selection) with a half second pause after each beep:
  "Press PAUSE to select desired option: . . . backward?" . . . (beep)
  "forward?" . . . (beep)
  "absolute position?" . . . (beep)
  "select song track?" . . . (beep)
  "sound quality?" . . . (beep)
  "control options?" . . . (beep)
  "repeat this menu?" . . . (beep)
  "return to tape?" . . . (beep)
  "need instructions?" . . . (beep)
  "explain these options in more detail?" . . . (beep)
  (3 second pause)
  Then if no action has been taken the processor 210 resumes the performance or takes whatever other default action is associated with this menu. Whether the user is a novice or otherwise, the appropriate default may alternatively be a parameter which is under user control.

Suppose the user selected "backward" by pressing PAUSE after a quarter second after its enunciation started but before a half second after its trailing beep. This prompts the processor 210 to present a deeper, more specific, AudioMenu:
  "Rewind in increments of . . . two seconds?" . . . (beep)
  "five seconds?" . . . (beep)
  "fifteen seconds? . . . (beep)"
  "one minute? . . . (beep)
  "three minutes? . . . (beep)
  "ten minutes? . . . (beep)
  "rewind to beginning?" . . . (beep)
  "forget the rewind?" . . . (beep)
  "repeat menu?" . . . (beep)
  "return to previous menu list?" . . . (beep)
  (half second pause)

Depending on the selection:
  the processor generates another menu counting up in the specified time increments from which the user selects the specified time. Some elements of this menu may include interspersed escape options such as "forget rewind", or "repeat list", in case the user misses the desired selection, so the list will not go on tediously long if the user misses his selection: By way of example, suppose the user had selected "15 seconds" from the previous menu then the next menu might sound like:
    "go backward 15 seconds?" . . . (beep}
    "30 seconds?" . . . (beep)
    "forget the rewind?" . . . (beep)
    "45 seconds?" . . . (beep)
    "one minute?" . . . (beep)
    "repeat this list?" . . . (beep)
    "go backward one minute 15 seconds?" . . . (beep}
    "one minute 30 seconds?" . . . (beep)
    "forget the rewind?" . . . (beep)
    "one minute 45 seconds?" . . . (beep)
    "two minutes?" . . . (beep)
    "repeat this list?" . . . (beep)
    . . .
    "15 minutes, 45 seconds?" . . . (beep)
    "start of performance at 35 minutes 52 seconds . . . go to the start?" . . . (beep)
    "forget rewind?" . . . (beep)
    "go to rewind control list?" . . . (beep)
    "repeat this list?" . . . (beep)
    There are many variations on this, for example, playing a sample at each interval (especially if the performance is actually a narration), or increasing the time jump of each step, etc.

Eventually the list stops after either a given limit number of entries (say 100?)—requiring the user to select a larger step; or when the start or end of the performance is reached.

If the user selects a desired rewind time; the processor 210 locates the corresponding performance resume point in the stored performance memory, stops menu handling, and resumes the performance from the revised point. Otherwise the device performs the desired menu operation if one of those is selected; repeats this menu; or returns to the performance with no re-positioning; or returns to the previous menu.

If nothing is selected, then one reasonable default would be to return to the previous rewind menu to allow another step interval to be chosen.

Similar schemas could be presented for
  positioning forward,
  selecting an absolute position within the current selection or overall performance, to select another selection or "track" (borrowing CD terminology);
  allowing the user to adjust the volume or sound quality in ways the equipment might itself not normally permit.

By pressing PAUSE within a quarter second after the item enunciation starts, and before a half second (these times, of course, are not necessarily ideal or rigid for any particular embodiment) after the trailing beep, the user selects that item. What happens depends on the selection. As indicated, some selections may result in additional (deeper) menus, in repeats of the current or previous menu, of changes being made to the state of the current performance—for example in its position or sound quality. As appropriate, it is possible some changes, such as sound quality, could be stored in the device's permanent memory and persist indefinitely across performances.

Examples of features which could be AudioMenu option items include:
  forward positioning
  backward positioning
  positioning to an absolute moment of a performance, including the beginning or end
  selecting a particular song or track, by number absolute to the entire suite of performances (e.g., first, second, third, . . . ) or relative to the current "track" (e.g., "next", "previous"), or by enunciated name (if available). This could be done by relative position (next, previous, etc.), by absolute number (song number one, . . . ), or by enunciated name: "The Way We Were", "Lara's Theme", etc. It is possible for the "track" names to be stored on the permanent performance memory (e.g., the memory card) in some pre-enunciated form, or in ascii "text" form as they do on CDs. In the latter case, the device must have sufficient pre-stored tables to perform audio voice synthesis.
  scanning a series of tracks or songs, by sampling the first few moments of each—allowing selection by content sample,
  listing a series of different time increments.
  listing a series of different numbers
  listing a series of different times, possibly with intervening "escape" options.
  allowing adjustment of volume or other aspects of sound quality such as bass or treble, or simulating various presentations—such as auditorium, outdoor arena, theater, etc.
  setting the mode of play of multiple "tracks": for example: randomized, continuous loop, playing favorites only; playing random favorites, etc.
  designating "favorite" songs as they are heard.
  moving through a presentation at accelerated (or otherwise modified) speed—like fast forward on a VCR. To support this feature, the device processor 210 must be programmed to perform digital audio sound compression.
  repeating the current menu
  returning to the previous menu
  returning to the performance
  listing a set of points, typically the most recent few, at which the performance has been interrupted. This allows the user to select to return directly to an earlier point of play.
  providing helpful instructions or hints
  selecting the way the menus are spoken (verbose or terse); with or without extra instructions, etc.,
  determining the natural languages in which the options should be rendered (English, French, German, Japanese, etc.)
  listing a series of items supplied, specified or created by the user
  changing parameters—for example the time intervals in which the user must react between option selections—allowing such changes to replace the defaults.
  the order of menu items—so the user can position more frequently used options earlier.
  whether to include special sounds.
  querying and listing the name and/or other information regarding the current selection, including its name, artist, author, the current position (e.g., time) within the selection; the amount of time remaining. For example: "two minutes twelve seconds—into Phantom of the Opera—by Andrew Lloyd Webber—four minutes thirty five seconds remaining."
  checking battery power status
  loading parameters from a control memory as is described further below.
  listing the current parameters and providing the ability to change them.
  which features should be used in menus.
  allowing return to a previous "position" point. The processor 210 can store in some permanent memory a list of previous points at which the performance was interrupted by AudioMenu. This list itself can be presented, allowing the user to return to a previous point in case the subsequent position has not been satisfactory. The previous point list may be based on the last moment that at least "n" uninterrupted seconds of normal play occurred. This would enable a user to stop the system, move forward or backward in the performance, and play a media sample for up to "n" seconds without losing the original place.

Examples of parameters which could be options: The order of the menu items—so the user can position more frequently used options earlier; whether to use long or short explanations; whether to include more detailed "help" verbiage; whether to include special sounds, including the user's own rendition or selection of verbiage; specifying various parameters such as, for example the reaction time and response latency times; what the AudioMenu activation control rules should be (such as the example's six second period to enter the PAUSE-PLAY-PAUSE-PLAY sequence); what the menus themselves should be.

Other uses for AudioMenus The innovation of AudioMenus can be advantageously applied to other devices capable of generating audio output and receiving rudimentary input signals from a user. This could be applied outside the present device to include such devices as CD players, regular cassette players, etc. Such devices could possess special switches for recognizing simple use response, or could even accept simple audio feedback responses such as clapping noises or grunting. More sophisticated voice recognition would also be possible is some embodiments. This would be handy for an audio device in an automobile, or in headphones for jogging, where the user has more available capacity for audio and verbal attention than for manual or visual attention.

Offline Loading

Just as various embodiments of the device accept performances from external sources: such as from memory cards or by having its permanent internal memory loaded through a cable, it is also possible to use such a conduit to load control and parameter information into the device. For example, such information could be loaded on special memory cards, be distinguished by some convention (such as "track or file names") from standard audio performances. When such data is encountered by the device, it would take steps to assimilate the associated control information. Further, it is possible that such loading could itself be regulated by the device through existing internal Audio Menus, which guide the user to accept or decline parameter or parameter suite changes.

In many cases, building such parameter specifications and loading them into the device is an option which may reduce the amount of permanent onboard storage needed to hold all the possible audio control option enunciations. "Off-line" loading can be useful if the user has a computer; and may be necessary if the device has inadequate permanent memory to hold all the variable instructions. It may also be more efficient to set these parameters in a computer friendly application with graphic menus, than with spoken menus.

Modes of Operation of the Additional Embodiment in Portable, Free Standing Mode

In the additional embodiment, the present invention provides for use of the device in a portable, freestanding mode. This enables the user to listen to music, record music and other audio information when the cassette equipment is not available or convenient for use. It should be noted that in this additional embodiment, battery 175, or some other power source, must be present.

For use in the portable, freestanding mode, the invention provides the with user one or more input user control buttons 198, a display 199, and a headphone jack 197B. This implementation allows the user to listen to music and other audio information when the cassette equipment is not available or convenient for use.

In another implementation, the invention also provides an integral microphone 196, and may further provide an external microphone/auxiliary input jack 197A. This allows the user to also record music and other audio information when the cassette equipment is not available or convenient for use.

Operation of the device in the portable freestanding mode is described below. For clarity of explanation, the Off Mode will first be described. Other modes of operation will become apparent through the description of the user input control buttons. It should be noted that the implementation described is only one of many possible implementations and this description should be viewed as illustrative without limiting the scope of the invention.

Off Mode

In the Off Mode, the device is dormant namely, the power supply and control 220 has removed power from substantially all of the PCB 200 and other device components. The display 199 is blank, providing indication to the user that the device is off.

Play/Pause/Off Button 201

The Play/Pause/Off Button 201 (further referred to as Play) is used to turn the device on, initiate play of a performance, pause play of a performance and turn the device off. In the exemplary embodiment, it functions as follows:

If the unit is in the Off Mode, then depressing Play 201 signals the power supply 220 to activate or signal the processor 210 to turn the device on and initiate the play of the performance. Thus, the depression of one of the user control buttons 198 associated with cassette device triggers entry into the free-standing operation mode. As in use in cassette equipment, it is possible for the device to maintain the current state of the performance (current position, volume, tone and other characteristics) for a plurality of cards, such that when the unit initiates play of the performance, it resumes from the point at which it last terminated play of that particular card. The processor 210 writes information to the display 199 such as the remaining capacity of the battery, the name of the card(s) installed in the device and the state of the performance being played. This could include the name of the performance, the volume, the tone, total length in time of the performance, elapsed time, time remaining. The unit is now said to be in Play Mode.

If the unit is in Play Mode, briefly pressing a button, Play 201 signals the processor 210 to halt play but maintain the current state of the performance and causes the device to go into Pause Mode. In the Pause Mode, the power supply and control 220 has power to PCB and other device components needed to maintain information on the display. All the information that was on the display in Play Mode could remain. This will continue to indicate to the user that the device is on. However, the device also needs to indicate that it is in Pause Mode so the user can distinguish between Pause and Play. This could be done by displaying an additional message. In this exemplary embodiment the additional display information is "Pause". Other components not needed for maintaining information on the display can have power removed to conserve battery power.

If the unit is in Pause Mode, pressing Play 201 briefly signals the processor 210 to resume play of the performance. The processor 210 also removes "Pause" from the display.

If the unit is in Pause Mode pressing Play 201 for an extended time (for example 2 seconds), signals the processor 210 to put the device in Off Mode. The processor 210 removes power to substantially all components including itself.

If the device is left in Pause Mode for long period of time (for example 1 minute), the processor 210 turns the device off by removing power to substantially all the components including itself.

Of course, the function of PLAY (Start), Pause and Stop could be segregated to more than one button.

Reverse Button

The Reverse Button 202 (further referred to as Reverse) is used to step back through the performance data on the card in a reverse manner (end to beginning). It can be used to step back within the current performance selection, to the beginning of the current performance selection, to the beginning of the adjacent performance selection towards the beginning of the card, and to the beginning of the card. It operates as follows:

If the device is currently playing a performance selection, pressing Reverse 202 and holding it in a pressed state signals the processor to step back within the current performance selection at a substantially faster rate than Play Mode plays the performance. The device may optionally operate to let the user hear the rapidly reversing performance in order to allow them to seek a specific location in the performance. The processor 210 also maintains an accurate representation of the performance time (total, elapsed, and remaining), as another method to allow the user to seek a specific location in the performance. The device could increase the reverse speed to a higher rate the longer the reverse button 202 is pressed to give the user a faster method to seek a location considerably far from the current location in the performance. When the button is released the processor 210 is signaled to resume play at the current location. In the case that Reverse 202 continues to be pressed and the location has moved to the beginning of the current selection, the device next steps back through the adjacent performance closer to the beginning of the card. Note the last performance on the card can be considered to be adjacent to the first such that when stepping back through the beginning of the first performance, the next track to be stepped back through is the last performance on the card.

If the device is currently playing a performance selection, pressing Reverse 202 briefly causes the processor 210 to reverse to the beginning of the current performance selection and resume play.

If the device is playing the beginning of a performance, pressing Reverse 202 briefly causes the processor 210 to reverse to the beginning of the adjacent performance selection towards the beginning of the card and resume play. If the current selection is the first selection on the card, as noted above, the last selection on the card could be considered the adjacent selection.

If the device is currently playing a performance selection, pressing Reverse 202 briefly followed quickly by pressing Reverse and holding Reverse 202 causes the processor 210 to reverse to the beginning of the current card and resume play.

If the device is in Pause Mode prior to pressing Reverse, the above reverse operations are duplicated with the exception that play does not resume after the operation and the unit is paused at the new location. The display 199 can show an indication of how the Reverse, or any of the other button-initiated operations are progressing.

Forward Button

The Forward Button 203 (further referred to as Forward) is used to step forward through the performance data on the card in a forward manner (beginning to end). It can be used to step forward within the current performance selection or to the beginning of the adjacent performance selection towards the end of the card. In the exemplary embodiment, it operates as follows:

If the device is currently playing a performance selection, pressing Forward 203 and holding it in a pressed state signals the processor to step forward within the current performance selection at a substantially faster rate than Play Mode plays the performance. The device could be designed to let the user hear the rapidly advancing performance in order to allow them to seek a specific location in the performance. The processor 210 also maintains an accurate representation of the performance time (total, elapsed, and remaining), as another method to allow the user to seek a specific location in the performance. The processor could control the display of an indication of this on display 199. The device could increase the Forward speed to a higher rate the longer the Forward button 203 is pressed to give the user a faster method to seek a location considerably far from the current location in the performance. When the button is released the processor 210 is signaled to resume play at the current location. In the case that Forward is continues to be pressed and the location has moved to the end of the current selection, the device next steps forward through the adjacent performance closer to the end of the card. Note the last performance on the card can be considered to be adjacent to the first such that when stepping forward through the end of the last performance, the next track to be stepped forward through is the first performance on the card.

If the device is currently playing a performance selection, pressing Forward 203 briefly causes the processor 210 to Forward to the beginning of the adjacent performance selection towards the end of the card and resumes play. If the current selection is the last selection on the card, as noted above, the first selection on the card could be considered the adjacent selection.

If the device is in Pause Mode prior to pressing Forward 203, the above Forward operations are duplicated with the exception that play does not resume after the operation and the unit is paused at the new location.

It should be noted that the device could be configured to concatenate a plurality of cards present such that reversing, forwarding and playing could behave as above detailed in a way that the multiple cards behave as a single card containing the full set of performance selections contained on the plurality of cards present.

Volume Up and Volume Down Buttons

Pressing the Volume Up and Volume Down buttons 204, 205 signal the processor to increase or decrease the volume of the performance respectively. These buttons can be depressed briefly to slightly increase or decrease the volume, or they can continue to be pressed and the processor 210 will continue to increase or decrease the volume until the limits of the volume are reached or the user releases the button. If the limits of the volume are reached, the processor 210 can sound a beep indicating to the user that the limit has been reached.

Mode Button

The Mode Button 206 is used to change the modes of how the device operates. Pressing the Mode Button 206 (further referred to as Mode), signals the processor 210 to display a menu of options. Volume Up and Volume Down 204, 205 now function as Up and Down buttons for the user to use for scrolling through the menu options. The option items would be highlighted to indicate the current scroll location. The user would highlight the desired option and again press Mode 206. Options can include but are not limited to:
1. Tone
2. Track Announcement 3. Playback Order
4. Card Configuration Once the Mode option is selected, the sub menu would appear. For Tone, these could be:
1. High
2. Mid
3. Low The user would then select the desired option by scrolling to highlight the desired tone and press Mode again. This would signal the processor 210 set the set the tone of the playback to the selected value.

The other options would have a similar operation in that a sub menu associated with them would be displayed. It should be noted that sub menus options could also have sub menus associated with them.

It should be recognized that the free-standing mode of operation also contemplates the use of the audio menu methodology described in detail above. Such an audio menu feature may, if desired, be used in addition to the user control features expressly described in conjunction with the free-standing embodiment.

Record Button

For the embodiment that includes the capability for record, the device includes a Record Button 207. The user would first press the Record Button and then press the Play Button 201 (further referred to as Record). The Record Button 207 and Play Button 201 should be situated in the housing such that the Record Button 207 is not likely to be inadvertently pressed while the user is actually attempting to put the device in Play Mode. When Record 207 is pressed, the processor is signaled to begin recording. This allows the device to be used as a voice recorder. The user could also use the External Microphone/Auxiliary input jack to connect to the audio output jacks of an audio system using patch cables. This allows the device to be used to record performances played on the audio system.

In addition, the buttons 198 and display 199 can be used in "cassette player" mode, for example, to step through menu options textually before the device is played in the equipment.

Figure 8:
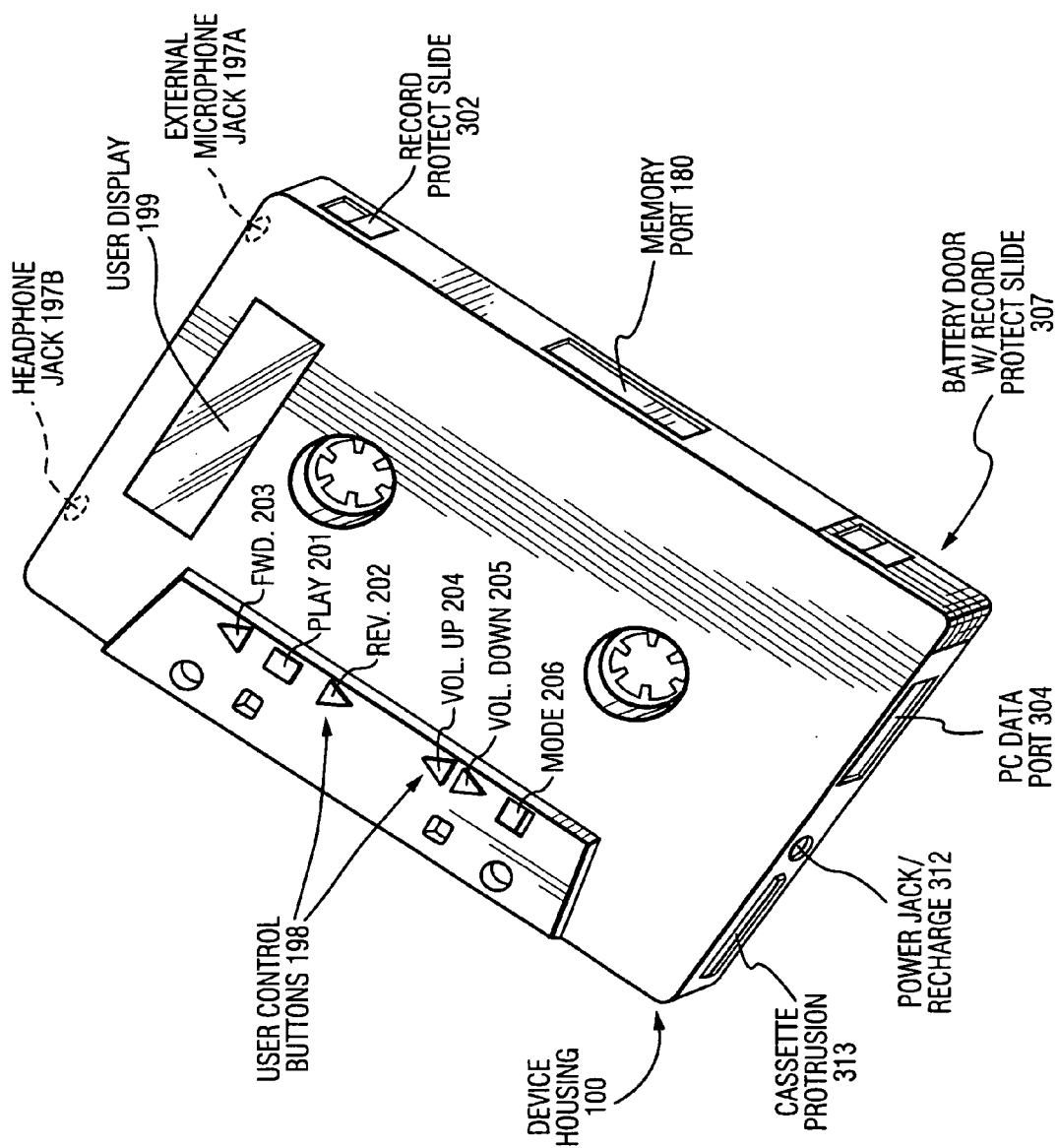
FIG. 8 is a perspective view of an illustrative implementation of device housing 100.

FIG. 8 is a perspective view of an illustrative implementation of device housing 100. Device housing 100 includes user control buttons 198 such as forward 203, play 201, reverse 202, volume up 204, volume down 205 and mode 206, which function in the manner described in detail above. FIG. 8 also depicts an exemplary disposition of the previously described user display 199, external microphone jack/connector 197A, headphone jack/connector 197B, memory port 180, and power jack/battery recharge connector 312.

When operating in the previously described record mode in conjunction with, for example, a conventional cassette player/recorder, a user may choose to actuate the "record protect" slides 302 and 307. In the illustrative embodiment, the record protect slide 307 is integral with a battery compartment door sized to enable loading of battery 175 (FIG. 1). The actuation of a record protect slide protects the user from unintentionally recording over a previously recorded musical/audio performance. The record protect slide is configured to slide to expose a cassette housing side area which substantially replicates the area exposed when a conventional cassette record protect tab is broken off in a standard cassette. Upon exposing this area adjacent, for example, record protect slide 302, entry into the record mode is not be possible because the equipment's record feature is disabled such that movement of a cassette recorder's record head cannot occur and likewise the device will not initiate entry into the record mode. The record patent slide(s) can also incorporate electrical switches which can be electrically connected to the processor. In such an embodiment, the processor can test the state of the switch upon entering record in the stand alone mode. If the switch position indicates record protect is activated, the processor then aborts entry into record mode and displays a message on the user display 199 indicating record protect is active.

Also shown in FIG. 8 is PC data port 304, which is used in accordance with one exemplary embodiment to couple device 100 to a personal computer, as is described further below. A power jack/recharge port 312 is shown for receiving power from a conventional power source for powering the device and for recharging internal battery 175. A standard cassette protrusion 313 is depicted in FIG. 8.

Figure 9:
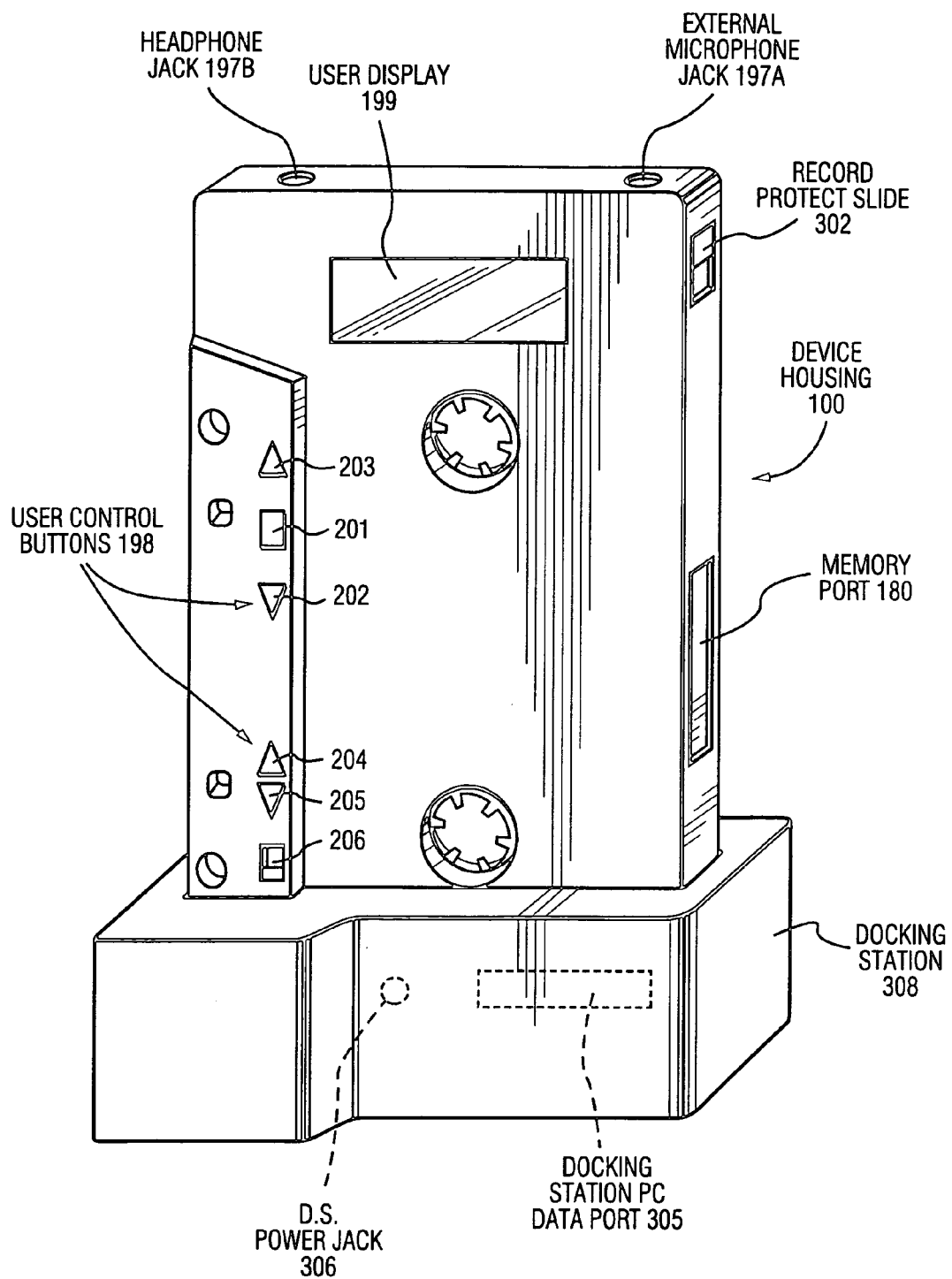
FIG. 9 is a perspective view showing device housing 100 disposed in a docking station 308.

FIG. 9 is a perspective view showing device housing 100 disposed in a docking station 308. Docking station 308 is configured to receive a device housing 100 and has a body configured, as shown in FIG. 9, such that it protrudes outwardly in the vicinity of the cassette device housing user control button area which likewise protrudes outwardly (i.e., is somewhat wider than the housing portion which receives a removable memory in memory port 180). Docking station 308 includes a PC data port 305 which receives a communications cable for communicating with a PC. In accordance with an exemplary embodiment of the present invention, a PC connection may be made with, for example, a communication cable connector that is inserted into docking station PC data port 305 (shown in FIG. 10B) or, alternatively, into the device 100 PC data port 304 shown in FIG. 8.

Figure 10A:
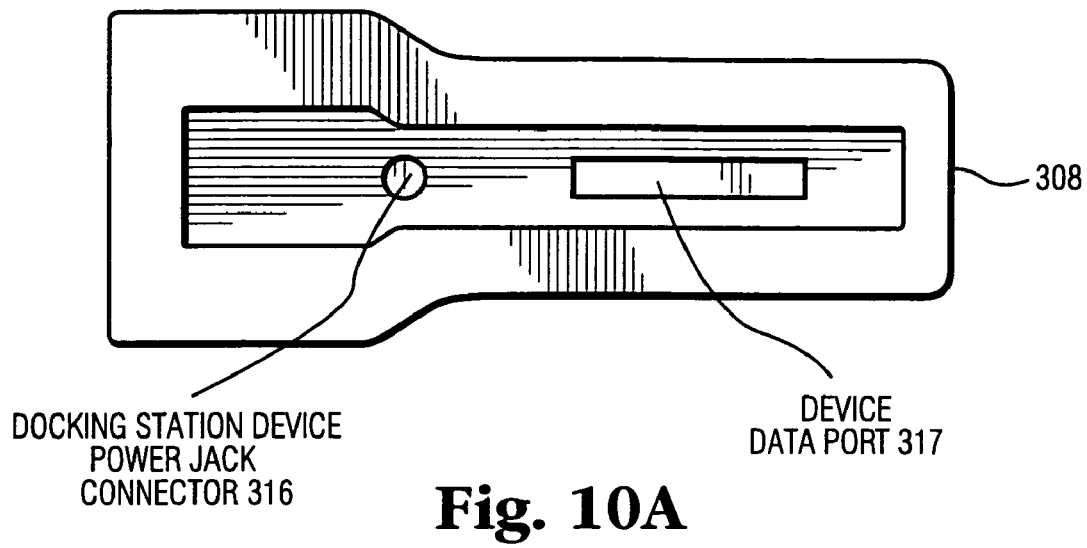
FIGS. 10A and 10B are top and rear side perspective views of docking station 308.
Figure 10B:
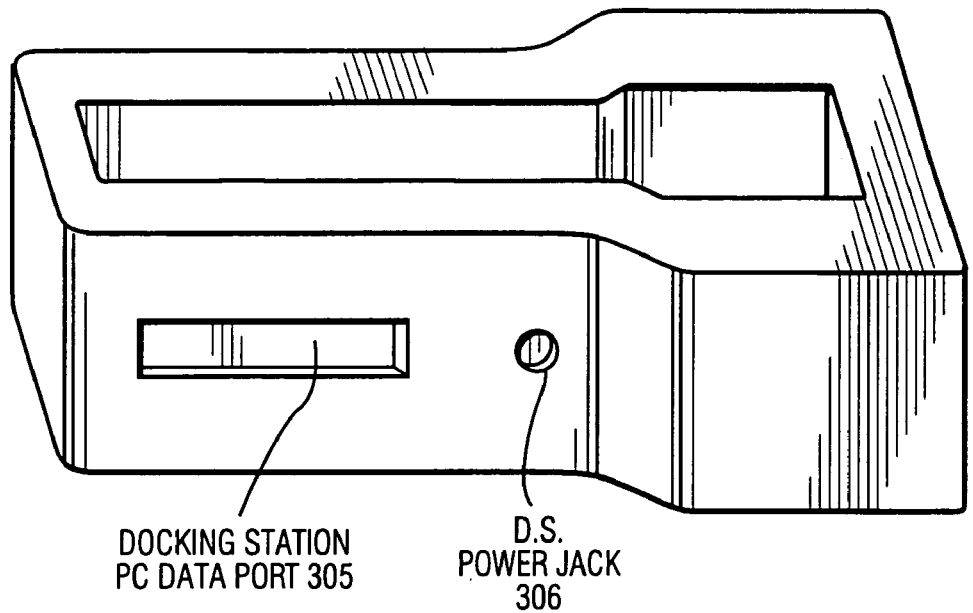

Docking station 308 also includes a power jack/connector 306 as shown in FIG. 10B. A power jack/connector 312 is likewise provided on the device housing 100 as shown in FIG. 8. FIG. 10B is a rear side view perspective view of docking station 308 without device housing 100 inserted therein.

As shown in FIGS. 9, 10A and 10B, docking station 308 is configured such that a user can readily determine the device housing disposition for easy insertion into the docking station. When the device is inserted into the docking station, the docking station's device data port 317 connects with the device's PC Data port 304 and the docking station's device power jack 316 connects with the device's power jack 312. As should be apparent from FIGS. 8, 9, 10A and 10B, communication may be established between device housing 100 and a PC (or other computer) with or without docking station 308. As will be appreciated by those skilled in the art, appropriate power and data interconnections exist within the docking station as suggested in FIG. 11.

As shown in FIG. 9, after utilizing device 100 with, for example, an automobile cassette player, a user may transport the device to a PC located at work or home, insert the device into a docking station 308, and have ready access to user control buttons 198, user display 199, memory port 180 and headphone jack 197B. The device 100 may be readily used while receiving external power through power jack 306, 316, and 312. Power jack/connector 306 like device power jack 312 is configured to receive power from various conventional power sources including adapters which operate in conjunction with, for example, an automobile cigarette lighter.

In addition to docking station 308, other accessory devices are contemplated for use in conjunction with device housing 100 such as, for example, a "holster-type" or other carrier member which, for example, facilitates coupling the device via a clip to, for example, a jogger's belt. Such a carrier member preferably includes material (e.g., leather in an upscale version) for circumscribing the device housing, while leaving control keys 198, user display 199, and headphone connector 197B exposed for easy access. Many different designs of such holster/carrier type devices are contemplated as will be apparent to those skilled in the art.

Figure 11:
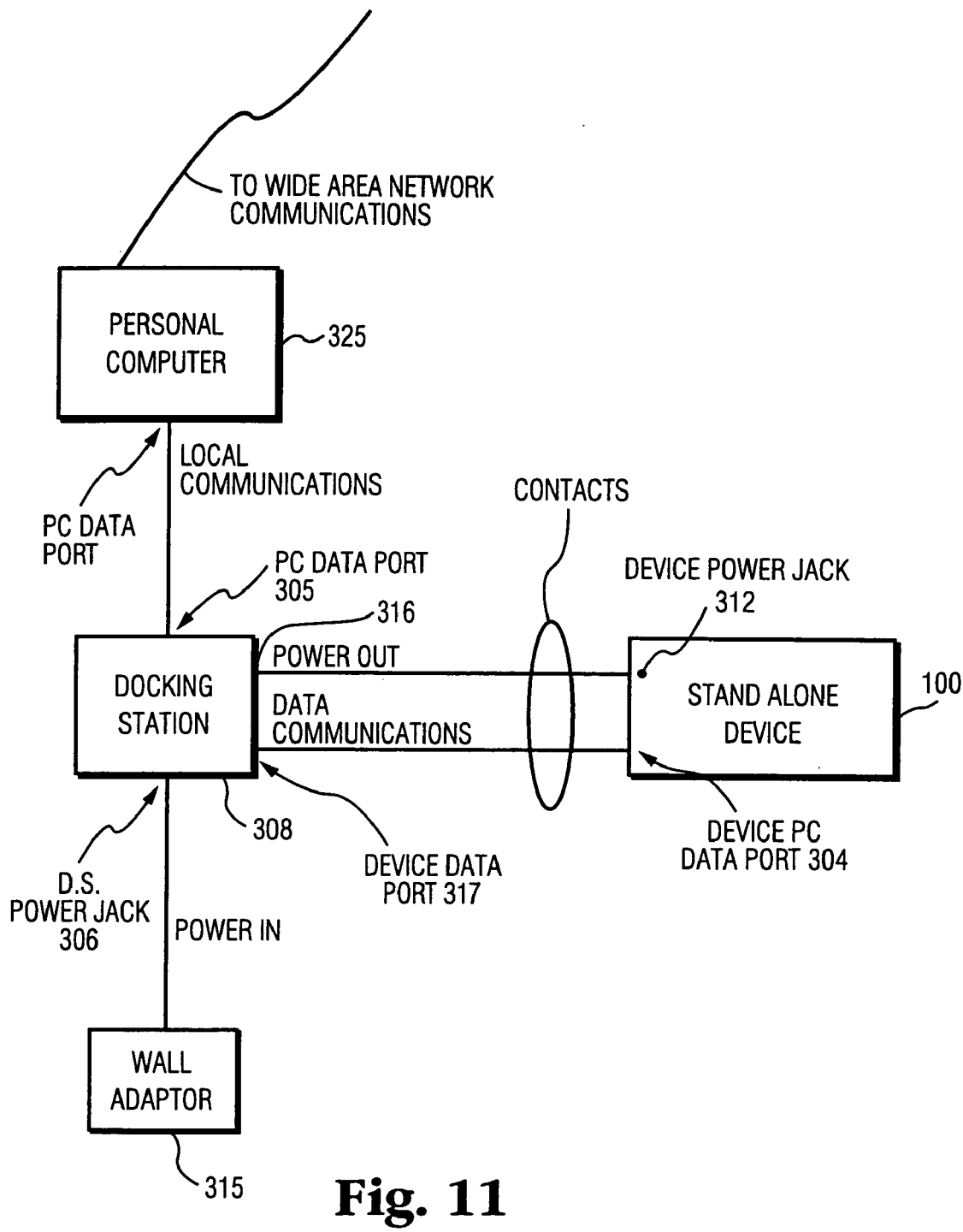
FIG. 11 is a block diagram of a communications system including device 100 coupled to a docking station, personal computer and wide area network.

FIG. 11 is a block diagram that schematically represents a communications system including device 100 coupled to a docking station 308. Docking station 308 is coupled to personal computer 325, which is coupled to a wide area network communications system such as the Internet. As shown in FIG. 11, connections between docking station 308 and stand-alone device 100 are accomplished with mating connector contacts as suggested by the exemplary implementation shown in FIGS. 9, 10A and 10B. As previously described, docking station 308 can be removed from the block diagram such that personal computer 325 may be directly connected to device 100 via its PC data port 304. Likewise, wall adaptor 315 rather than being coupled to docking station power jack/connector 306 may be inserted directly into device 100's power jack/connector 312.

Docking station 308 may be implemented to simply pass through the local data communications between personal computer 325 and device 100. Alternatively, docking station 308 may include a microprocessor and an associated memory (not shown) for interfacing between standalone device 100 and personal computer 325. The docking station may, in addition to the microprocessor and associated memory, also include a modem for providing connection to the Internet without requiring a PC. In this fashion, a user traveling and desiring Internet access may, through such an intelligent docking station 308, access a web site such as MP3.com and purchase or otherwise download audio information in the form of music or books. Alternatively, a user at home or at work may use, a personal computer 325 to download such audio information from such a web site to device 100.

The system shown in FIG. 11 can likewise be utilized (either with personal computer 325 or with the above-referenced intelligent docking station 308) to access the Internet, input a user's account number, and download a purchased song from a music vendor's web site using the secure cryptographic techniques described in detail below.

The present exemplary embodiments envision not only downloading information from the Internet to a personal computer 325 and then to cassette device 100, but also contemplates uploading information from the cassette device 100 to, for example, personal computer 325 or another network-based computer. In this regard, by using an external microphone jack 197A or an integral microphone, a user may dictate letters, business memoranda, patent applications, contracts or other legal documents, etc., as previously described in a "record" mode. Upon reaching the user's PC, either at home or at work, device 100 may be inserted into docking station 308, and the audio information may then be uploaded to PC 325 and, for example, be converted from digital audio to text in PC 325 using conventional transcription software.

Media Distribution Control

In describing the following media distribution illustrative embodiments, the following elements and abbreviations are used:

Device is the hardware which processes the digital information (e.g., "music"). In the exemplary embodiments, devices are end-user, consumer devices such as a Audio Cassette Emulator of the type described herein or as a "Rio" type device, etc. However, despite these examples, the invention should not be construed as restricted to these type of devices.

Music is the term generally used herein to refer to the digital information which is processed by the device. It is intended that the examples be interpreted to encompass virtually any type of information, despite the fact that "music" is referred to in the exemplary embodiments.

MUV (Music Vendor) is the entity responsible for distributing the music (information) to the devices. In the exemplary embodiment, this distribution occurs as a digital transmission typically over a network.

DID (Device IDentifier) This is any identifier by which the device can be distinguished. In the preferred embodiment, the identifier is unique for each device, but it is possible for multiple, or all, devices to share a common DID.

DCK (Device Cryptographic Key) This is the cryptographic key by which information to be played in the device is controlled. Various embodiments could use either a Symmetric (e.g., DES) key or an Asymmetric (e.g., RSA Public) encryption key. In this latter case, the device holds the secret private key corresponding to the non-secret public key. Whether or not the DCK is symmetric affects some of the steps in handling music and keys.

CDM (Central Device Manager) This repository held by one or more entities maintains a history of the device, what music is no longer valid for this device, or has been transferred to another device.

DHC (Device History Counter) This resides as part of the DHT and is incremented each time a change is made to the DHT. When presented with new DHT related information, the device uses the DHC to determine whether this supersedes its current version of the "latest" information.

DHT (Central Device History Table) This central history record is maintained for each device. Depending on the embodiment it may contain minimal to much information about the device, its music and owner, including for example: The DID, the DHC (Device history counter), the list of UMIDs (unique music ID) which have ever been associated with this device, their associated AMIDs (abbreviated music ID), the next AMID to be assigned, the list of currently valid AMIDs, DID (if any) from which each AMID was transferred, the DID (if any) to which each defunct AMID was transferred, possible validation information (such as passwords, etc.) for the device, or the DCK (when it is asymmetric or when it is symmetric and when the CDM acts as the DKH).

DKH (Device Key Holder) When the DCK is symmetric, a DKH is an entity (there could be multiple) which is able to use or provide (to authorized entities) the (secret) DCK for encryption. Although this disclosure often refers to them in the singular, it is understood there can be multiple DKHs. For the symmetric situation, the DCK is accessed with the corresponding DID.

MCK (Music Encryption Key) This is the encryption key typically symmetric, under which music is encrypted. This may be set once and never changed, changed occasionally, or changed for each device. The first two choices are somewhat preferred in the exemplary embodiment (because it places less encryption burden on the MV, and because it simplifies implementation of some features).

UMID (Unique Music Identifier) is a unique identifier for each selection of music capable of being acquired for the device. For example, this might be a manufacturer's or vendor's identifier, coupled with the vendor's assigned identifier for each particular music selection, or it might be an ascending 110 integer maintained in some universal registry.

AMID (Abbreviated Music Identifier) is an identifier assigned for each piece of music which has been distributed to the device. The list of these is typically maintained by CDM. The abbreviated format is preferred in the exemplary embodiment since these identifiers are used to control music which has been revoked from a device (as a transferor), and the size of the identifiers is minimized to reduce the amount of data which must be transmitted, stored, and maintained within each device. This also allows the CDM to control re-distribution of music for failed or lost devices without having to maintain a database of the actual music associated with any user (which is viewed as useful by protecting consumer privacy).

Simplified Cryptographic Embodiment:

Creating the Device

As shown in FIG. 2, the device contains digital processor(s) 210, and the ability to process the music (e.g., play it) in many ways. In the illustrative embodiments, the processors 210 perform required decryption operations. As each device is manufactured it is assigned a DID and is loaded with its DCK. In the ideal embodiment, each device has a unique DID and DCK. Different embodiments of the invention allow either asymmetric (a.k.a. public key, e.g., RSA) or symmetric (e.g., DES or triple DES) cryptography to be used for the DCK.

When the DCK is symmetric, the DCK is generated and is stored both in the device (e.g., 270, 271, or 272) and in confidential records maintained by the DKH which is associated with (e.g., indexed by) the DID. When the DCK is asymmetric, then the private component need only be retained by the device; the public component can be stored freely by anyone or by no one (depending on the amount of service to be provided). Ideally the public component is certified by a reliable authority as being associated with its device. It is possible the public key, or some derivative thereof, could be used as the DID, although it is apt to be an unwieldy size. Depending on the level of security, the device could generate its own key. In the asymmetric case, no permanent record need be kept of the device (the certificate would serve as validation), although this might inhibit certain recovery and protection features.

Requesting Music

Once the device is in a user's hands, the user requests music from a MV by presenting the MV with the DID, an indication of the music to be acquired, together possibly with billing information and other parameters (e.g., the types of compression desired, etc.). While the most likely presentation of this is with a computer by the user through a network connection, the presentation could be made by physical transfer by one or both parties (e.g., the user presents the information on a paper form, and the MV response with music on a physical medium).

In response, the MV takes steps to encrypt access to the music under the DCK.

In a commercial setting, the MV is apt to require payment for the music.

The MV or the CDM may also make a permanent record of which music which has been transmitted. In this case, the MV may allow the purchaser to download the same music (already paid for the same device) again for the same device for free or at a special price; or may allow copies to be downloaded at special prices for other devices.

Receiving the Music

When the user receives the music from the MV, the user may store this music in any appropriate way—on the user's computer's hard disk, on a CD-ROM, on SmartMedia, etc.). The only device(s) capable of accessing the music are those which can decrypt material encrypted using the DCK.

Because the music is encrypted in a way so that it is accessible only by the device, a library of the encrypted music may be stored by the user on memory external to the device. Such memory can include a combination of computer-related memory: RAM, hard-disk, ZIP disk, CD-ROM, etc., memory cards, etc.

Playing the Music

When the device receives the encrypted music it accesses the plaintext through (one or more levels of) decryption. When DCK is symmetric, the device does this with its DCK; in the asymmetric case, it uses its secret private key corresponding to the public key.

Each music item contains a header providing information about the music, as well other possible features described later.

Transferring Music from Lost or Damaged Devices

This invention provides a mechanism whereby the music may be "transferred" from one device to another. This is especially important in the event a device is lost or damaged—otherwise the user's entire stored library of purchased music becomes useless. While this may be acceptable if the material at risk were only a single song, having an entire library at risk is something from which an exemplary embodiment of the present invention protects the user.

In this case, the user contacts an entity capable of re-encrypting the music under the key of the different substitute device. Of course, there is the risk that the user will cheat and continue to play music on the old device, however, this is a minor problem compared with the risk that plaintext music is widely disseminated over a network. Because all transfers are centrally controlled, policies can be established to inhibit excessive transfers.

It is also possible that the MV or the CDM may choose to require a service charge for the transfer.

Transferring Music to Another Device as a Courtesy

It is also possible to transfer individual music items from one device to another as a service to accommodate personal needs. For example, a user may have multiple devices for playing in different locations (e.g., in home versus different vehicles), and may wish to re-arrange and re-mix the suites of music played at these different sites without requiring all devices at all locations. For example, a user may wish to move music purchased for use in a device in the home, to a device played while traveling. Such transfer runs the risk that the user will continue to use the music on the devices from which it was transferred. One aspect of the invention allows the MV to mitigate potential theft by insuring a device can never acquire new music without losing the ability to play music "retired" on that device.

Exemplary embodiment: Memory Chip Loaded Externally to the Device

Creating the Device

In the symmetric case, the manufacturer generates a random DCK key. It may be permanently built-in to memory installed in the device; or the value may be presented later to the device which stores the value permanently in a special memory coupled to the processor(s) 210, and which changes its internal state to inhibit storing such a value again. The DCK is stored in conjunction with the DID which is also assigned at this time.

In the asymmetric case, the private key is installed in the device. The private key may, for example, be generated either by the device (which then transmits the associated public component to the "manufacturer") or by the manufacturer who certifies the key as being associated with the device. If a digital certificate is presented to and stored by the device, then it is not necessary for the manufacturer to keep any further record. With asymmetric cryptography, the DID plays a reduced role, and may not even be required. In many ways the public key, or the certificate, can act as a DID. If created, the DID can be included in the device certificate, although this is not required.

Requesting Music

In the exemplary embodiment, the user requests music for the device over a network through the user's computer. This step may involve entering the DID (in some embodiment, especially, for asymmetric DCK, the DID may actually be the DCK, or may be used in some combination with the DCK, or some derivative such as its certificate, or its hash; for symmetric DCK, the DID may be like a serial number). This can be done on a once-only basis (and the DID can be maintained permanently in the user's computer), or each time the user wishes to acquire music.

There are many ways of entering the DID and/or DCK. For example, the user can enter the DID independently of the device (from paper, or labeling or documentation associated with the device); or the device can write its DID to the computer through a cable or some other communication means.

In an exemplary embodiment, where the device uses Memory Chip cards as means for accessing music, a chip card can be used to communicate the DID to the computer: the user installs a memory card into the device. As part of operation, the device writes a special indicator on the card, in an identifiable section of the memory, indicating the DID of the device most recently using the card.

The user then makes this card accessible to the computer, which reads the DID and other information the device may have written. For symmetric DCK this includes the DID (like a serial number); for asymmetric DCK, this may include the full device certificate and public key (which may also be used in conjunction with the DID).

In the interest of recovery (described later), the user is encouraged to maintain a permanent computer record of these device identifiers for all such devices owned. In the exemplary embodiment, the user is also encouraged to assign a meaningful identifier ("name") to the user's record for each device, so that the device can be readily identified requiring interaction with the device itself. This is important if the device becomes lost or damaged, and the user needs to transfer its music without having access to the device.

The user then connects to the MV, decides which music selections to acquire, provides the DID (perhaps by selecting from the menu of devices which the user owns, perhaps selecting more than one device), indicates the billing, authorization, ownership and payment information (as appropriate), and may include other information (such as type of compression, desired).

The program operating on the user's behalf transmits this information to the MV.

On receipt of this, the MV checks the validity of the billing authorization and ownership, and payment information, and possibly completes billing at this time. For each music selection it determines the corresponding UMID.

For symmetric DCK, it then sends the UMID & MCK for the selected music, together with the DID, to the CDM (Central Device Manager).

The CDM adds the UMID (Music ID) to the DHT (Device History Music Table) which stores the list of all music allowed for the device. The CDM may create an AMID for this music entry which is also stored in the DHT.

AMIDs are used to minimize the amount of storage required within permanent device memory, and in music headers. If the size of the UMID is reasonable and constrained, then the step of assigning an AMID may be bypassed (in which case the UMID is considered to be the AMID). See section privacy considerations, which may constrain how the UMID and AMID are handled in some embodiments.

In the exemplary embodiment, the next assigned AMID is incremented for each piece of music acquired for the device. For example, these identifiers start with "1" for each device.

The CDM prepares a table indicating which AMIDs remain valid for the device. This table maybe either inclusive (the list of those AMIDs which are valid), or exceptional (the list of those which are invalid). The preferred embodiment uses an exception list, uses 16 bit AMIDs—which allows over 65,000 pieces of music to be acquired for a single device throughout its history, and up to 1000 outstanding exceptions (i.e., revoked music items at any moment) in only 2000 bytes of permanent storage per device.

The exemplary embodiment goes beyond this and uses an additional value, the Valid Threshold Origin (VTO) to allow even greater flexibility. For any new device, this origin starts as zero. If the device is ever deactivated, or has all of its music invalidated and transferred to another device, the CDM sets the VTO to a value beyond the previous maximum AMID. All AMID values less than the VTO are considered invalid. The latest VTO is preferably included by the CDM in every music header, and recorded, when seen, by the device in its permanent storage. The effective AMID of any music is taken as value which appears in the device or the music header table, augmented by the VTO associated with the respective table. Any AMID less than the VTO is considered invalid, so when an elevated VTO is encountered, a device can clear its permanent table of all lesser (exceptional) AMIDs, thereby conserving table space for wholesale invalidation's. The device and music header tables can be kept as 16 bit entries, even if the device should be cleared and reset many times. To be meaningful, the VTO is an integer with greater width (e.g., 32 or 64 bits) than the (16 bit) AMID table entries. The full AMID defined in the header for each piece of music itself should also be full VTO width (but only one or two such fields need appear in each music header).

The CDM increments the DHC (Device History Counter). The CDM then encrypts access under the DCK, to the following "protected header" information: The MCK, the music's AMID, the latest new DHC, the UMID for the music, and a summary of the DHT indicating the currently valid AMIDs (by exception only, with AMIDs offset by the VTO; while the implementation could use inclusion, that would be apt to require more data space), and the latest VTO. Not all of these items are necessarily included for every contemplated variation of the exemplary embodiments.

As previously mentioned "encrypting access" to material under a particular key, is intended to indicate that the material itself is encrypted under the particular key, or (perhaps recursively) that access to another (e.g., symmetric) key under which the material is encrypted is itself encrypted under the particular key. In any case, the material's plaintext can ultimately be recovered by decrypting the data which was encrypted with the particular key).

In one preferred embodiment in which the DCK is asymmetric, at least part of the protected header is encrypted under a key derived from the MCK (in particular, for example, a key generated by hashing the concatenation of the DID and the MCK). The protected header is then encrypted under this derived symmetric key, said derived key is then encrypted under the DCK. This allows the MV to recover the protected header in event of device failure, in order to recover it for the user and re-encrypt it under the DCK for the substitute device. In the case where the MCK is changed periodically, an indication of the particular generation of MCK should be recorded in plaintext in the (unprotected) music header. During transfer-recovery this allows the MV to determine which MCK was used to derive the intermediate key.

A further variation of this, which functions when the DCK is either symmetric or asymmetric proceeds as follows: a random symmetric key is created, and it is used to encrypt, for example: the MCK, the music's UMID, the device's AMID for the music, the latest DHC, a summary of the DHT indicating the currently valid AMIDs (either by exception or inclusion), the latest VTO; and the random key is encrypted under the MCK. In addition, for asymmetric DCK, the random key can also be encrypted by the MV (or any entity with access to the public DCK). For symmetric DCK, the random key is encrypted by the DKH (Device Key Holder) and returned to the MV who completes the transaction with the user. Via the DCK (or its private counterpart for the asymmetric case), the device is able to extract the random key and thence the encrypted header. Having the random key encrypted under the MCK also allows the MV to recover the header if the music is ever eventually transferred to another device.

Additional information which may in the "non-protected" portion of the music header includes: the AMID, the UMID, and the DID, can be added by any responsible party. These plaintext fields are used to manage the user's music "library" and simplify its handling.

When the DCK is symmetric, the device can trust the AMID list since it is encrypted with the DCK which is presumably known only by the device and the CDM. When the DCK is asymmetric, this technique does not provide authentication for the AMID list and related control material since any entity may be able to encrypt a header with the DCK. Therefore the AMID list—together with the latest DHC, the VTO, and the AMID of the current music—preferably need to be authenticated. In one preferred embodiment, this information is digitally signed by the CDM using asymmetric cryptography. This requires the device have an embedded way of having or recognizing the CDM's public key, or some root certifier thereof, e.g., by having its exact value or some hash of it, or some derivative of it. Of course use of digital signatures by the CDM can be done whether DCK is symmetric or asymmetric.

It is possible the MV is the same entity as the CDM, especially when the DCK is asymmetric, and no central secret repository of device DCK is required.

As indicated earlier, as a courtesy to the user, the MV could check records (perhaps held by the CDM) before billing the user, to determine if the UMID has already been purchased and remains valid for the indicated device. If so, as a courtesy, the MV could simply download another copy for the user at little or no repeated cost. Finally, the MV returns to the user's computer the music header, and the encrypted protected header, together with the music encrypted under the MCK.

Receiving the Music

When the user receives the music from the MV, the user may store this music in any desired way—on the user's or computer's RAM or hard disk, on CD-ROMs, on a ZIP disk, on memory cards, etc. The user can establish a library of music, which can be selectively marshalled into suites and presented to the device to be played. Of course, because the music is encrypted, regardless of where the package is stored, only the user's authorized devices are capable of accessing the plaintext music.

At such time as the user desires to process the music with the device, the user makes the package (headers and encrypted music) accessible to the device—e.g., by transmitting it to the device through a cable, infra-red, etc., or, as in the exemplary embodiment, indirectly by copying it onto a memory chip card which is then coupled to the device.

Playing the Music

On receipt of this package, the device decrypts the protected header (using either the DCK if it symmetric, or the corresponding private key if the DCK is asymmetric), from which the device obtains the MCK, the AMID, the VTO, the DHC and DHT summary current when the header was created. If it was digitally signed, as the preferred embodiment would have it (at least when the DCK is asymmetric), the device verifies the signed material—which should at least include the above-mentioned items—ultimately chaining back through a series of public key signatures (certificates) until reaching a public key which can be verified by virtue of indicators embedded within the device. This ultimate verification can be based on having an embedded root key, or a hash of some value related to a root key.

If the presented DHC does not exceed the latest DHC stored within the device, no further action is taken with it—otherwise the device realizes it has now received a later DHT summary and stores its essence: the updated DHC, VTO and AMID table, in the device's "permanent" table to reflect the latest known status.

There may be many pieces of music loaded into the device at once. Before playing any selection, the device checks the AMID in the music's header against the device's "permanent" table of AMIDs. If the table is inclusional the current music's AMID must be in the table; if it is exclusional (as in the exemplary embodiment) the AMID must be absent from the table. The music's AMID is invalid, for example, if it has been transferred to another device. In this case, the device can generate a message such as "music selection (name) has been transferred to another device" and present it to the user. The name of the music can be extracted from the music header if it was included there. When the music actually is audio content, the device can generate the message audibly (possibly using speech generation to convert the name from an internal form to audio format).

Assuming the music passes the appropriate validity tests, including having a valid header encrypted using the DCK, passing content validity tests, such as parity checking, to protect against any corruption during storage and copying, and assuming the AMID remains valid, the device can play the music by decrypting music content with the MCK.

Transferring Music

There are many options that could be taken to perform this operation, depending on music owners policies, whether the devices are implemented with symmetric or asymmetric cryptography, etc.

Consider one variation in which the device uses symmetric DCKs:

To transfer music from a lost or damaged (old) device to a substitute (new), the device owner transmits the following information to the CDM: the old DID, the new DID, together possibly with billing, ownership and authorization information for the old and/or new devices as the CDM policy requires for security. This might consist, for example, of the old device serial number, or a secret password taken from the old device's documentation. The CDM or MV may require some payment for this service.

Once sufficient information has been verified to satisfy CDM policy, the CDM creates new headers for all of the music to be transferred. There are many ways this can be done, none of which is clearly preferable to the others under all policies; for example:

- the CDM obtains the UMIDs from the DHT, accesses each corresponding MV, who re-sends (probably using encrypted communications) the corresponding MCK (possibly in exchange for some payment). This gives various MVs policy control of whether they wish to participate in this procedure.
- the CDM had stored the MCKs in the DHT and has them immediately available.
- the CDM requires the various music header be re-transmitted by the user as part of the transfer process. This is effective if the DCK is symmetric, since the CDM can obtain the old DCK from the DKH, decrypt each old protected music header using the old DCK. If the DCK is asymmetric, then this method will not recover the MCK, and an alternative method is described below.

Once each MCK is recovered, it is re-packaged for the new device: a new AMID is assigned, it is added to the new DHT. Similarly the old AMID is invalidated by removing it from the old DHT, Using the VTO schema described earlier, the old VTO is set to equal to the next AMID to be assigned. This will automatically invalidate all earlier music if the old device is ever recovered and acquires any header from the CDM.

After all AMIDs have been moved, the new DHC is incremented for both devices, a header is created and encrypted for each music item for the new device. Each header will contain the appropriate new DHT summary. The old DHT is updated to show the DID of the receiving device; the new DHT is updated to show the donating DID. In accordance with one exemplary embodiment, this level of detail may be stored for each music selection.

Although there is no way to "reach into" the old device (since it probably no longer even available) and update its table, any future attempt to enhance its music selection with additional music will effect the update. Additional policy precautions can be taken by preventing excessive transfers—e.g., the CDM can limit the total number of allowed substitutions; number of transfers per unit of time, etc.

In the case when the DCKs is asymmetric and the private key remains secret within the device, it is impossible for an entity to decrypt the protected music header in the same way the device does. In this situation, the music can be recovered if a central list is maintained of all the purchased music (such as by the CDM), and this list is used in conjunction with the MV to reconstruct content for the substitute device. Alternatively, no such central record of individual music selections need be maintained (e.g., for privacy reasons) if the users is made responsible for maintaining and supplying a history of all collected music, and if the music headers are encrypted under an intermediate symmetric key which derived from the MCK coupled with the DID or under a random key encrypted under the MCK, as described earlier. In this case, on receipt of a copy of the music header, the MV can re-construct the symmetric key (independently—ignoring the value encrypted under the public key), and recover the protected header, or at least the portion necessary for reconstruction. This content will confirm the music had been authorized for the device, and will reveal the device's AMID for that music. The AMID can be checked against the current CDM table to insure it still remains valid, and the header can be re-encrypted using the same technique with the public key of the new DCK.

Courtesy Duplication Prevention

Before billing for the new music, the MV may query the DHT through the CDM with a transaction containing the UMID and DID to determine if a valid entry already exists in the DHT for this UMID. On a positive response, the MV can avoid redundant billing. In addition to be being a simple courtesy to the user (in event the user loses his own copy of the library), it may be desirable as a fail-safe means to prevent double billing in event communication breaks with the user after billing has occurred and the DHT is updated, but before the music transfer to the user is complete.

Other Courtesy:

The plaintext of the DID may be added to the music header. If the music is presented to a device for which is not authorized (e.g., a user copies a piece from his store to the wrong device)., the device can diagnose this and present a message to the user. For audio devices this message might be speech synthesized, perhaps even identifying the actual device.

Privacy Considerations:

It may be considered undesirable, for political, legal or marketing reasons, for the CDM to maintain a list of the music which has been acquired for various devices, especially if the devices are linked to the identity of individuals for billing, validation or authorization reasons. In accordance with an exemplary embodiment, this invention allows most of its operations without requiring permanent records being maintained outside the user's domain. This can be accomplished, for example, by observing these constraints:

- The UMID is never recorded in the DHT.
- The AMID is attached to each music header as plaintext
- The same AMID is embedded in the encrypted portion of each music header
- The UMID is recorded in each encrypted music header
- When transferring music from one device to another, the user is required to present at least the headers for all music to be transferred. Assuming the DCK is symmetric, the old DCK can be located by the CDM and used to decrypt the music header. The AMID from the decrypted header is used to identify the entry to be removed from the DHT. A new AMID is assigned for the new device, and the process progresses much as earlier described, except no UMID is stored in the new DHT. The DHT can still maintain the list of valid/ defunct AMIDs, together with the device to/from which they were transferred. However all cases, the DHT contains only AMIDs and never actual UMIDs. Therefore the CDM stores no permanent information about the particular music habits associated with the device or user.

Changing MCK Periodically

The MV may choose to change each MCK periodically (e.g., once a day). This may depend on the level of security inherent in the device. If so the MV should retain the list of MCK generations, especially if the embodiment expects to recover music and retain privacy, and an indication of the MCK generation can be maintained in relative plaintext in conjunction with all material encrypted under the MCK.

Public Key Considerations

Most of the variations described above assume the DCK is symmetric, and there are special considerations and possibilities which exist if the device is capable of doing asymmetric cryptographic operations, and if its DCK is a public key.

In order to control transfer of music among devices, and maintain a history to forestall excessive abuse, it may still be desirable to have the DHT, otherwise the DHT may not be necessary. In such public key based systems, the following implementation features are desirable.

Each DCK is certified by an authority in such a way that the MV can be assured the DCK belongs to one of the associated devices. Ideally the DID is included as part of the certification each device embodies the private DDK (Device Decryption Key) which need not be known outside the device.

When sending acquired music, the MV encrypts music header under the MCK (which is symmetric).

In addition, if the MCK is ever subject to change (e.g., period change for security), then an indication of the particular version of the MCK (e.g., its effective date) should be stored in plaintext as part of the music header. The MCK is encrypted under the DCK. The MCK may also be concatenated with the DID (or some other unique random or distinguishing value) before encryption to insure the same value is not encrypted under several public keys (which would, e.g., invite certain cryptographic attacks under, say, RSA).

The device then uses the DDK to decrypt the MCK which can be used to decrypt the header and the music.

On transferring a piece of music from one device to another, the transfer CDM or MV should receive each music header; together with the DID and DCK of the old device.

The content of the music header can be decrypted with the MCK. When there are multiple versions of the MCK (e.g., changed daily), the MV identifies the particular version from the version indicator which is stored in plaintext as part of the music header. The music header can then be re-constituted for the new device as explained earlier, and encrypted under the MCK. The secret MCK is combined with known distinguishing values (such as the DID) and encrypted under the DCK for the new device.

If the music header us encrypted under the MCK, then the encrypted material should also include the associated target DID. Otherwise the same header might be construed as valid for any device.

It is also possible to create a pseudo-random key with which to encrypt the protected music header (PMH), by combining the MCK with the DID in some way, e.g., the MCK and the DID could be combined using some hash operation; or the MCK could encrypt the DID and other known material to create a distinct symmetric key with which to encrypt the music header. This allows both the device and the MV to access the header. The former for accessing purposes, the latter for recovery purposes if the device is lost or damaged. In this case the key will be distinct for each DID, but predictable only by someone with knowledge of the particular MCK.

The CDM can be entirely eliminated if it is acceptable to either not provide the ability to transfer music from one device to another, or provide such ability, but with less assurance that it will not be abused.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An emulation device for insertion into a tape player having a plurality of user controls and a cassette driving mechanism comprising:

a solid state storage device for storing digital signals representing audio information;

an interface embodied in said housing for converting digital signals to magnetic signals which are presented to said tape player;

a processor, said processor interpreting user actuation of at least one of said tape player user controls as a command to control the presentation of said audio information in a predetermined manner;

a first spindle rotating member driven by the tape player cassette driving mechanism;

a second spindle rotating member;

a linking member coupled to the first spindle rotating member and the second spindle rotating member; and a sensor for monitoring the motion of said linking member and for generating a signal indicative of linking member motion; said processor being responsive at least in part to said signal indicative of linking member motion for controlling the presentation of said audio information.

2. A device according to claim 1, wherein said linking member is a belt such that when the second rotating member is driven the first rotating member follows the same motion.

3. A device according to claim 2, wherein the belt causes at least one of the first and second rotating members to rotate to emulate proper take up of a cassette tape.

4. A device according to claim 1, further including a generator coupled to at least one of said first rotating member and said second rotating member and said linking member.

5. A device according to claim 2, further including a belt tensioning member for varying the speed of at least one of said rotating members.

6. A device according to claim 1, further including at least one sensor for determining that said tape player is in a "play" mode.

7. A device according to claim 6, wherein said at least one sensor is a magnetic sensor.

8. A device according to claim 6, wherein said at least one sensor is an optical sensor.

9. A device according to claim 1, wherein said audio information includes a plurality of musical performances and the presentation of said musical performances is controlled to present a user specified musical performance.

10. A device according to claim 9, wherein said user specified musical performance is specified by advancing to the next performance.

11. A device according to claim 9, wherein said user specified musical performance is specified by musical performance number.

12. A device according to claim 9, wherein said user specified musical performance is specified by the user in response to an audio message.

13. A device for insertion into a tape player having a plurality of user controls and a cassette driving mechanism including a capstan comprising:
   a removable solid state storage device for storing digital signals representing audio information;
   an interface embodied in said housing for converting digital signals to magnetic signals which are presented to said tape player;
   a processor, said processor interpreting user actuation of at least one of said tape player user controls as a command to control the presentation of said audio information in a predetermined manner;
   a first spindle rotating member driven by the tape player cassette driving mechanism;
   a second spindle rotating member;
   a linking member coupled to the first spindle rotating member and the second spindle rotating; and
   a sensor coupled to said processor for monitoring the motion of said linking member and for generating a signal indicative of linking member motion;
   wherein said processor is operable in response to at least user input to control accessing said storage device to result in the presentation of said audio information at a user specified point.

14. A device according to claim 13, wherein said audio information includes a plurality of musical performances and the presentation of said musical performances is controlled to present a user specified musical performance.

15. A device according to claim 13, wherein said user specified musical performance is specified by advancing to the next performance.

16. A device according to claim 13, wherein said user specified musical performance is specified by musical performance number.

17. A device according to claim 13, wherein said user specified musical performance is specified by the user in response to an audio message.

18. A device according to claim 13, further including a second sensor coupled to said processor for sensing the rotational motion of the tape player's capstan and for generating a signal indicative of capstan rotational motion.

19. A device according to claim 13, wherein said linking member is a belt that causes at least one of the first and second rotating members to rotate to emulate proper take up of a cassette tape.

20. A device according to claim 13, further including a generator coupled to at least one of said first rotating member, second rotating member and said linking member.

21. A device according to claim 13, wherein said linking member is a belt and further including a belt tensioning member for varying the speed of at least one of said rotating members.

22. A device according to claim 18, wherein said second sensor is used by said processor to determine that said tape player is in a "play" mode.

23. A device according to claim 18, wherein said second sensor is a magnetic sensor.

24. A device according to claim 18, wherein said at least one sensor is an optical sensor.

25. In an interface device having a digital data processor and a digital memory for transferring audio information to tape equipment designed to process signals from magnetic storage media, the method comprising the steps of:
   rotating a first rotating member;
   rotating a belt linked to the first rotating member so as to drive a second rotating member;
   sensing the motion of said belt and coupling a signal indicative thereof to a digital data processor; and
   accessing an audio selection stored in a digital memory under the control of said digital data processor for presentation to a user based on at least the signal.

26. A method according to claim 25, further including the step of applying a tensioning force to said belt.

27. A method according to claim 25, further including the step of driving a generator with said belt.

28. A method according to claim 25, further including the step of storing said audio selection in a removable digital storage device for insertion into an insertion port in said interface device.

29. A method according to claim 25, further including the step of monitoring the motion of said belt.

30. For use with a device for insertion into an audio tape player having a plurality of user controls and for responding to user actuation of one of said controls to place said audio tape player in a state to initiate a selected operation when a cassette has been inserted into said player, a method for operating said device comprising the steps of: rotating a first rotating member;
   rotating a belt linked to a second rotating member so as to drive a second rotating member;
   detecting the motion of said belt; and
   determining at least one state of the tape player based at least in part on the detected belt motion.

31. A method according to claim 30, further including the step of driving a generator at least in part by said belt;
   coupling a signal from said generator to a digital processor; and
   determining by said digital processor the state of said tape player based at least in part on said signal from said generator.

32. A method according to claim 30, further including the step of applying tension to said belt.

33. A method according to claim 30, further including the steps of detecting with at least one sensor a change in operation of the audio tape player; and
   altering the presentation of audio signals in response to a detected change in operation of the equipment.

34. The method according to claim 33, whereby the step of detecting a change in operation includes the step of detecting at least the change to paused motion.

35. The method according to claim 33, wherein the step of detecting a change in operation includes the step of detecting at least the change to stopped motion.

36. The method according to claim 33, wherein the step of detecting a change in operation includes the step of detecting at least the change from no motion to forward operation.

37. The method according to claim 33, wherein said processor uses a position pointer to identify digital information for processing and presentation to a user and wherein said altering step, in response to said detecting step detecting a change in the operation of the audio tape player, includes the step of the repositioning said pointer to identify different digital information for processing and presentation.

38. The method according to claim 33, wherein said altering step in response to said detecting step detecting a change in the operation of the tape player includes the step of generating a user message signal by the device in the form of magnetic signals and transmitting said magnetic signals to the equipment.

39. A method according to claim 30, further including the steps of connecting said device to an external speaker, and controlling operation by said processor in an audio player mode independent of said audio tape player.

40. For use with a device for insertion into an audio tape player having a plurality of user controls and for responding to user actuation of one of said controls to place said audio tape player in a state to initiate a selected operation when a cassette has been inserted into said player, a method for operating said device comprising the steps of:

rotating a rotating member within the tape player;

rotating a belt in the device linked to said rotating member;

detecting the motion of said belt; and determining a current state of the tape player based at least in part on the detected belt motion.

41. A method according to claim 40, wherein said rotating member is the tape player's capstan.

42. A method according to claim 40, further including the step further including the step of driving a generator at least in part by said belt.

43. A method according to claim 42, further including the steps of coupling a signal from said generator to a digital processor; and determining by said digital processor the state of said tape player based at least in part on said signal from said generator.

* * * * *